(12) United States Patent
Matiss et al.

(10) Patent No.: US 10,795,086 B2
(45) Date of Patent: Oct. 6, 2020

(54) UNIVERSAL PHOTONIC ADAPTOR FOR COUPLING AN OPTICAL CONNECTOR TO AN OPTOELECTRONIC SUBSTRATE

(71) Applicant: CORNING OPTICAL COMMUNICATIONS LLC, Charlotte, NC (US)

(72) Inventors: Andreas Matiss, Berlin (DE); James Scott Sutherland, Corning, NY (US)

(73) Assignee: Corning Optical Communications LLC, Charlotte, NC (US)

(*) Notice: Subject to any disclaimer, the term of this patent is extended or adjusted under 35 U.S.C. 154(b) by 0 days.

(21) Appl. No.: 16/555,242

(22) Filed: Aug. 29, 2019

(65) Prior Publication Data

US 2019/0384007 A1 Dec. 19, 2019

Related U.S. Application Data

(63) Continuation of application No. PCT/US2018/021000, filed on Mar. 6, 2018.
(Continued)

(51) Int. Cl.
*G02B 6/26* (2006.01)
*G02B 6/02* (2006.01)
*G02B 6/122* (2006.01)

(52) U.S. Cl.
CPC .......... *G02B 6/262* (2013.01); *G02B 6/02314* (2013.01); *G02B 6/1221* (2013.01); *G02B 6/1225* (2013.01)

(58) Field of Classification Search
CPC .......... G02B 6/02314; G02B 6/1221; G02B 6/1225; G02B 6/262; G02B 6/3885; G02B 6/421; G02B 6/4292
See application file for complete search history.

(56) References Cited

U.S. PATENT DOCUMENTS 4,818,058 A * 4/1989 Bonanni ............... G02B 6/3838
                                                                     385/71
6,318,909 B1 * 11/2001 Giboney ............... G02B 6/4201
                                                                    257/700
(Continued)

FOREIGN PATENT DOCUMENTS

| DE | 10065034 A1 | 8/2001 |
| WO | 2018165002 A1 | 9/2018 |
| WO | 2019089220 A1 | 5/2019 |

OTHER PUBLICATIONS

International Search Report and Written Opinion of the International Searching Authority; PCT/US2018/021000; dated Jun. 18, 2018; 11 Pages; European Patent Office.
(Continued)

*Primary Examiner* — Daniel Petkovsek
(74) *Attorney, Agent, or Firm* — Grant A. Gildehaus

(57) ABSTRACT

A photonic adaptor has a first face side to couple the photonic adaptor to an optical connector and a second face side to couple the photonic adaptor to an optoelectronic substrate. The photonic adaptor comprises a plurality of optical fibers being arranged between the first face side and the second face side of the photonic adaptor. The photonic adaptor comprises at least one alignment pin projecting out of at least the first face side of the photonic adaptor. The at least one alignment pin is configured to be inserted in the optical connector to align optical fibers of an optical cable to the optical fibers of the photonic adaptor.

19 Claims, 26 Drawing Sheets

Related U.S. Application Data

(60) Provisional application No. 62/467,981, filed on Mar. 7, 2017.

(56) References Cited

U.S. PATENT DOCUMENTS

| | | | |
|---|---|---|---|
| 6,447,171 B1* | 9/2002 | Demangone | G02B 6/3869 |
| | | | 385/59 |
| 6,712,527 B1* | 3/2004 | Chan | G02B 6/4201 |
| | | | 385/88 |
| 7,949,211 B1 | 5/2011 | Grzybowski et al. | |
| 8,950,949 B2* | 2/2015 | Isenhour | G02B 6/122 |
| | | | 385/89 |
| 9,250,404 B2* | 2/2016 | Lim | G02B 6/428 |
| 9,341,786 B1 | 5/2016 | Gamache et al. | |
| 9,435,968 B1 | 9/2016 | Nishimura | |
| 10,345,535 B2 | 7/2019 | Butler et al. | |
| 2005/0163431 A1 | 7/2005 | Moynihan et al. | |
| 2014/0112629 A1 | 4/2014 | Numata et al. | |
| 2015/0355419 A1 | 12/2015 | Isenhour et al. | |
| 2016/0004021 A1 | 1/2016 | Pelletier et al. | |
| 2016/0116688 A1 | 4/2016 | Hochberg et al. | |
| 2016/0149662 A1 | 5/2016 | Soldano et al. | |

OTHER PUBLICATIONS

Ashiya, "Connectorized Packaging for PLC Devices," LEOS 2000. 2000 IEEE Annual Meeting Conference Proceedings. 13th Annual Meeting. IEEE Lasers and Electro-Optics Society 2000 Annual Meeting (Cat. No. 00CH37080), Rio Grande, 2000, pp. 716-717 vol. 2.

* cited by examiner

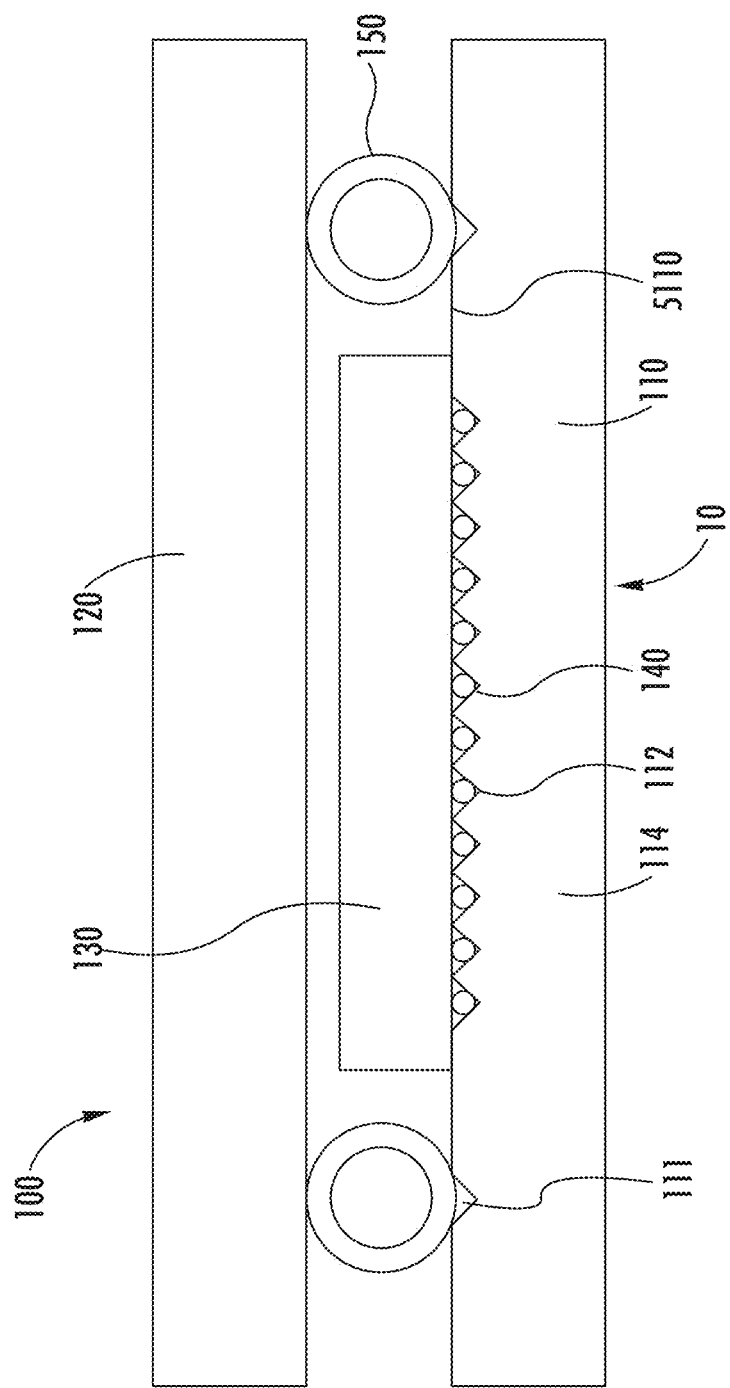

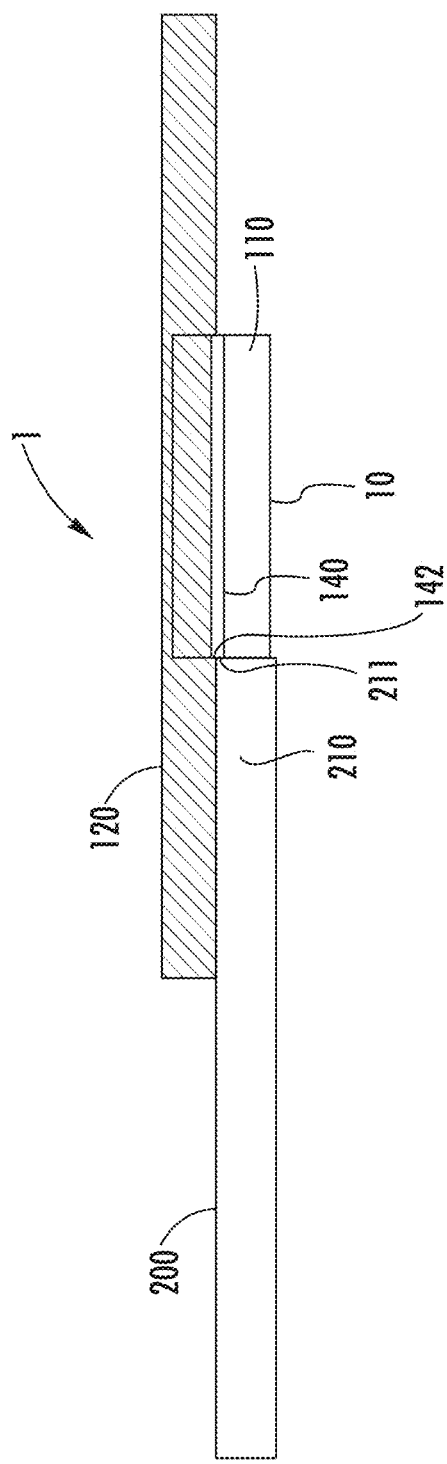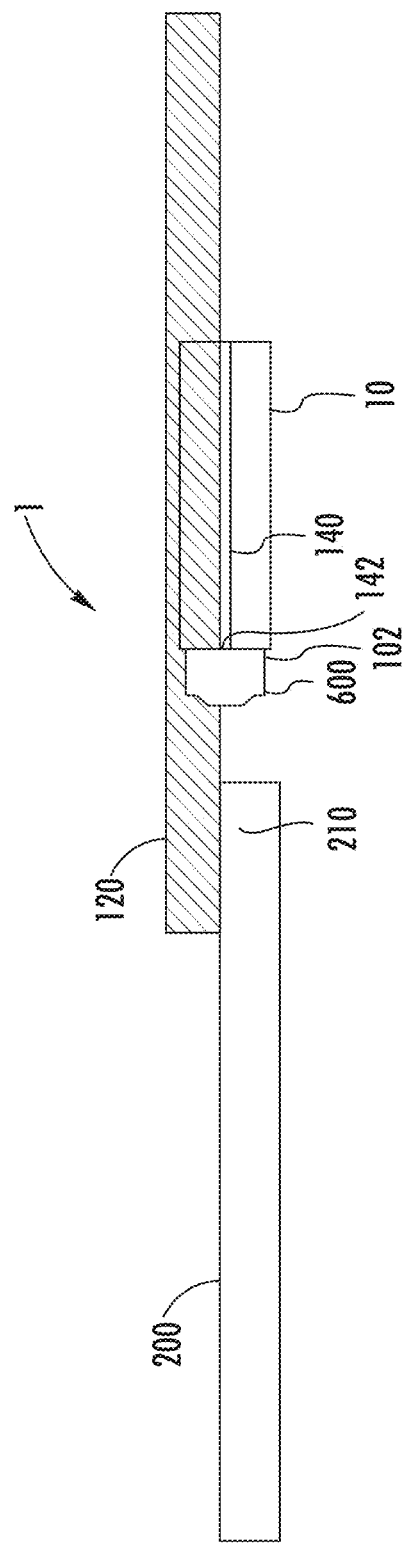

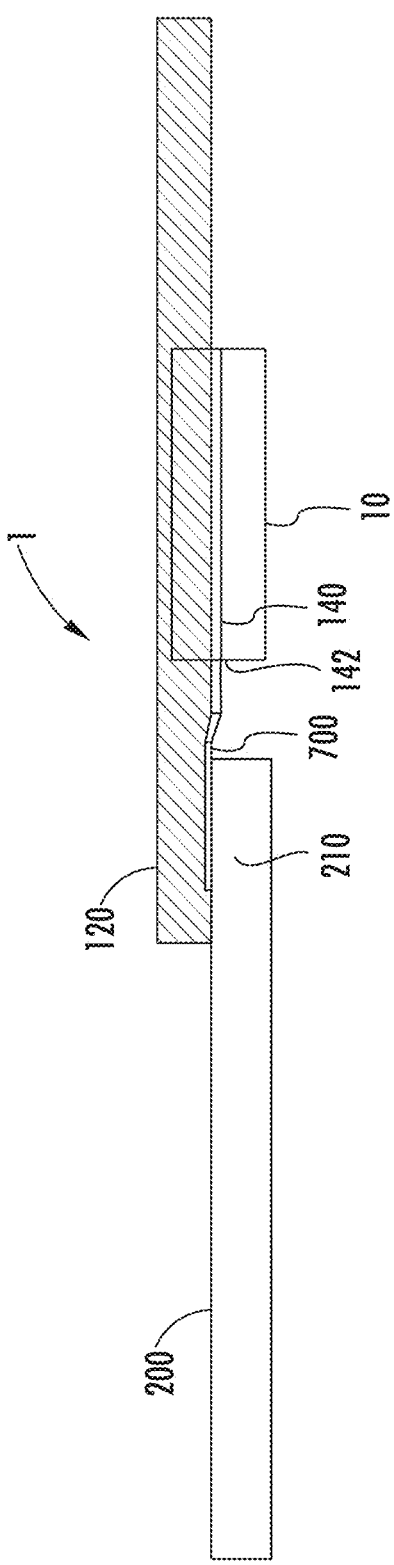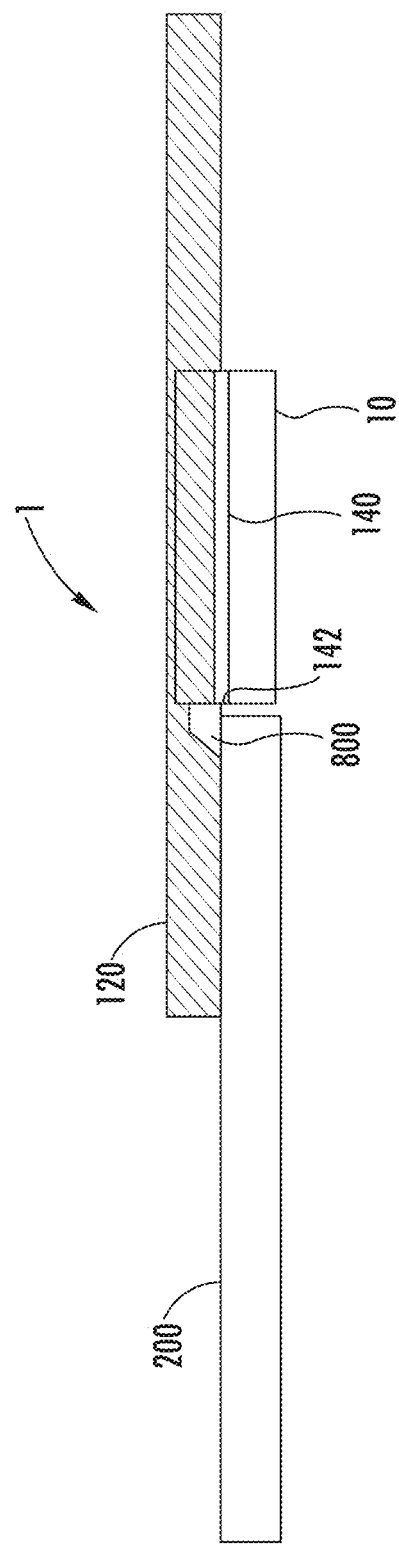

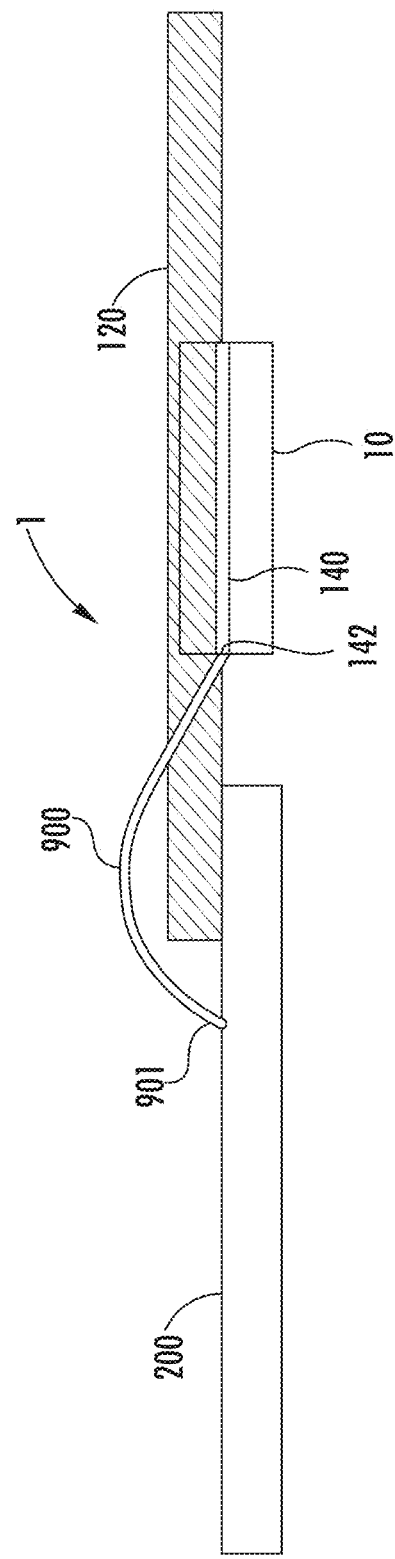

UNIVERSAL PHOTONIC ADAPTOR FOR COUPLING AN OPTICAL CONNECTOR TO AN OPTOELECTRONIC SUBSTRATE

PRIORITY APPLICATIONS

This application is a continuation of International Application No. PCT/US18/21000, filed on Mar. 6, 2018, which claims the benefit of priority to U.S. Application No. 62/467,981, filed on Mar. 7, 2017, both applications being incorporated herein by reference.

TECHNICAL FIELD

The disclosure relates to a universal photonic adaptor to be used for coupling an optical cable to an optoelectronic substrate.

BACKGROUND

An increasing number of applications use optical signals for the transmission of data. The optical signals are transferred via optical fibers of an optical cable. In order to further process the data, the optical fibers has to be coupled to an optoelectronic substrate that converts the optical signals transferred via the optical cable into electrical signals. The optoelectronic substrate may include a photonic integrated circuit (PIC) or a planar lightwave circuit (PLC). The optoelectronic substrate is arranged on a carrier substrate, for example a printed circuit board that includes an integrated electric circuit, such as an ASIC, to further process the electrical signals.

Fiber-to-chip interconnects are typically made by active alignment of the individual fibers of the optical cable to optical waveguides of the optoelectronic substrate. For this purpose, an optical connector terminating the optical cable has to be coupled to the optoelectronic substrate. According to a common technology, the optical fibers of the optical cable are bonded to a face side of the optoelectronic substrate, where the optical waveguides terminate, using adhesive UV curing. Sometimes supporting devices are used to support the optical fibers. Such supporting material blocks are usually glued to the side facet of the optoelectronic substrate.

This technology has the drawback that the connection between the optical fibers of the optical cable and the optoelectronic substrate cannot be released without damaging the previously mated assembly. Furthermore, the mated assembly of the optical cable/optical connector and the optoelectronic substrate is, in most cases, not compatible to be placed on a printed circuit board by a soldering process. During a soldering process, for example a reflow soldering process, temperatures of up to 260° C. occur and usually cause a distortion of the optical connection between the optical fibers of the cable and the optical waveguides of the optoelectronic substrate or even a destruction of the optical connection.

There is a need to provide a photonic adaptor for providing an interface between an optical connector terminating an optical cable and an optoelectronic substrate, wherein the photonic adaptor provides a connectivity platform which can be re-connectorized by optical connectors. A further desire is to provide an optoelectronic assembly comprising the photonic adaptor, wherein the optoelectronic assembly can withstand high temperatures that typically occur during soldering the assembly to a carrier substrate, for example by using a reflow soldering process.

SUMMARY

A photonic adaptor for providing an interface between an optical connector and an optoelectronic substrate is disclosed.

The photonic adaptor comprises a first face side to couple the photonic adaptor to an optical connector and a second face side to couple the photonic adaptor to an optoelectronic substrate, for example an optoelectronic substrate. The photonic adaptor further comprises a plurality of optical fibers being arranged between the first face side and the second face side of the photonic adaptor so that a respective first front side of the optical fibers terminates at the first face side of the photonic adaptor, and a respective second front side of the optical fibers terminates at the second face side of the photonic adaptor. The photonic adaptor further comprises at least one alignment pin projecting out of at least the first face side of the photonic adaptor. The at least one alignment pin is configured to be inserted in the optical connector terminating the optical cable to align optical fibers of the optical cable to the optical fibers of the photonic adaptor.

The photonic adaptor can be used as an interface between the optoelectronic substrate and the optical connector for transferring optical data between the optoelectronic substrate and the optical cable. The photonic adaptor may comprise a supporting substrate that may be configured as a glass plate. The supporting substrate may comprise at least one first groove to place the at least one alignment pin and second grooves with the optical fibers settled inside and polished from both sides of the supporting substrate. The first and the second grooves may be provided in the material of the supporting substrate. The second grooves may be arranged between two of the first grooves to receive the alignment pins. The first and the second grooves may be formed as V-grooves.

The at least one alignment pin may be fixed between the supporting substrate and another substrate. The substrates may be configured as silicone or glass substrates, for example glass plates. A low CTE (coefficient of thermal expansion) material is used for the at least one alignment pin that match to the glass and silicone of the substrates that hold the at least alignment pin. This allows for a large operating temperature range without degradation of coupling efficiency.

The at least one alignment pin may be configured to protrude out of both sides of the photonic adaptor. A first portion of the at least one alignment pin protruding out of the first face side of the photonic adaptor is configured to be inserted in the optical connector to align the optical fibers of the optical cable to the optical fibers of the photonic adaptor. A second portion of the at least one alignment pin protruding out of the second face side of the photonic adaptor is configured to be inserted in a mating structure on the side of the optoelectronic substrate to align optical waveguides of the optoelectronic substrate to the optical fibers of the photonic adaptor.

Also disclosed is an optoelectronic assembly for mounting to a carrier substrate.

The optoelectronic assembly comprises a photonic adaptor as specified in claim 1, an optoelectronic substrate, for example an optoelectronic chip, and a coupling and alignment layer. The optoelectronic substrate may include a photonic integrated circuit (PIC) or a planar lightwave circuit (PLC). The optoelectronic substrate includes optical waveguides. A respective front face of the optical waveguides terminates at a face side of the optoelectronic substrate. The coupling and alignment layer includes a mating structure being configured to receive the at least one alignment pin of the photonic adaptor to mate the photonic adaptor to the optoelectronic substrate. The mating structure and the at least one alignment pin are formed such that, in a mated state of the photonic adaptor and the optoelectronic substrate, the optical fibers of the photonic adaptor and the optical waveguides of the optoelectronic substrate are aligned to each other for transferring light between the optical fibers of the photonic adaptor and the optical waveguides of the optoelectronic substrate. The at least one alignment pin is arranged in the mating structure of the coupling and alignment layer.

On the side of the photonic adaptor, where the optoelectronic substrate is arranged, the at least one alignment pin is permanently connected to the mating structure of the coupling and alignment layer during the assembly process preferably using either a soldering or a welding technique. On the other mating side of the photonic adaptor, the photonic adaptor is configured as a universal optical interface that can connect to an external cable assembly.

In order to bond the at least one alignment pin to the mating structure of the coupling and alignment layer, a metal interconnect, for example a soldering or welding technique, is used. Compared to adhesive bonding, this technique allows for high assembly temperatures so that the photonic adaptor as well as the complete optoelectronic assembly, i.e. the optoelectronic substrate and the photonic adaptor in the mated state, can withstand high temperatures that usually occur during a soldering process, for example a reflow-soldering process, to mount the optoelectronic assembly on the carrier substrate, for example a printed circuit board.

The photonic adaptor provides a universal optical interface to the cable side that always maintains the same distance between the alignment pins, position of the individual optical fibers with respect to the alignment pins, and a physical contact connector mechanism. The photonic adaptor provides a customizable optical interface to the side where the photonic adaptor is mounted to the optoelectronic substrate. The coupling between the optical fibers of the photonic adaptor and the optical waveguides of the optoelectronic substrate may be performed by several methods, for example a physical contact coupling, a lensed coupling, a coupling by a flexible waveguide, for example a waveguide made of glass or polymer, to realize an evanescent/adiabatic coupling, an optical mirror turn coupling, for example by using a 45° mirror, or an optical fiber turn coupling, for example using a flexible optical fiber bent in a small radius and coupled perpendicular to the optical waveguides of the optoelectronic substrate.

The coupling and alignment layer including the mating structure may be arranged on a surface of the optoelectronic substrate. Since the photonic adaptor is not glued to the side facet of the optoelectronic substrate, but is mechanically coupled to the optoelectronic substrate by means of the at least one alignment pin that is fixed in the mating structure of the coupling and alignment layer, any mechanical forces are distributed over the surface area of the optoelectronic substrate instead of the edge of the optoelectronic substrate.

The coupling and alignment layer including the mating structure can be made of glass or metal. Using a glass structure allows for a flip-chip assembly, if glass through-vias are used in the material of the coupling and alignment layer for electrical interconnects between the optoelectronic substrate and the carrier substrate, for example a printed circuit board on which the optoelectronic assembly is mounted. Using a metal structure for the coupling and alignment layer allows for efficient heat spreading from the optoelectronic substrate to a cooling body.

BRIEF DESCRIPTION OF THE DRAWINGS

FIG. 1B shows a cross-sectional view of a first embodiment of the photonic adaptor for providing an interface between an optical connector and an optoelectronic chip.

FIGS. 20A to 20E show optoelectronic assemblies using different coupling schemes to optically couple a photonic adaptor to an optoelectronic substrate.

DETAILED DESCRIPTION

Figure 1A:
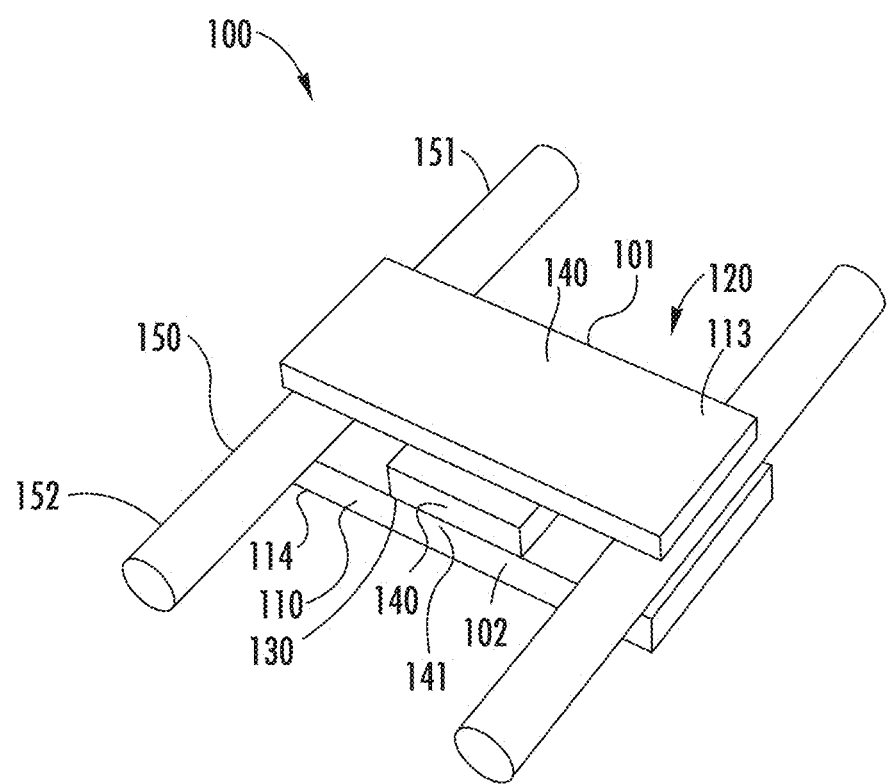
FIG. 1A shows an embodiment of a photonic adaptor for providing an interface between an optical connector and an optoelectronic substrate.

Embodiments of a photonic adaptor and an optoelectronic assembly including the photonic adaptor will now be described more fully hereinafter with reference to the accompanying drawings. The photonic adaptor and the optoelectronic assembly may, however, be embodied in many different forms and should not be construed as limited to the embodiments set forth herein; rather, these embodiments are provided so that the disclosure will fully convey the scope of the photonic adaptor and the optoelectronic assembly to those skilled in the art. The drawing are not necessarily drawn to scale but are configured to clearly illustrate the different embodiments of the photonic adaptor and the optoelectronic assembly.

FIG. 1A shows an embodiment of a photonic adaptor 100 for providing an interface between an optical connector and an optoelectronic substrate. The photonic adaptor 100 comprises a first face side 101 to couple the photonic adaptor 100 to an optical connector, and a second face side 102 to couple the photonic adaptor 100 to an optoelectronic substrate. The photonic adaptor 100 comprises a plurality of optical fibers 140 being arranged between the face side 101 and the face side 102 of the photonic adaptor. A respective front side 141 of the optical fibers 140 terminates at the face side 101 of the photonic adaptor. A respective front side 142 of the optical fibers 140 terminates at the face side 102 of the photonic adaptor.

The photonic adaptor 100 comprises at least one alignment pin 150 protruding out of at least the face side 101 of the photonic adaptor. FIG. 1A shows an embodiment of the photonic adaptor 100 comprising two alignment pins 150. The at least one alignment pin 150 is configured to be inserted in an optical connector terminating an optical cable to align optical fibers of the optical cable to the optical fibers 140 of the photonic adaptor 100.

The at least one alignment pin 150 has a first portion 151 projecting out of the face side 101 of the photonic adaptor 100. The portion 151 of the at least one alignment pin 150 is configured to be inserted in the optical connector to mechanically couple the optical connector to the photonic adaptor 100 and to align the optical fibers 140 of the photonic adaptor 100 and the optical fibers of the optical cable to each other for transferring light from the optical fibers 140 of the photonic adaptor 100 to the optical fibers of the optical cable and vice versa.

The at least one alignment pin 150 has a second portion 152 projecting out of the face side 102 of the photonic adaptor 100. The second portion 152 of the at least one alignment pin 150 is configured to be inserted in a mating structure of a coupling and alignment layer being mounted at the optoelectronic substrate to mechanically couple the photonic adaptor 100 to the optoelectronic substrate and to align the optical fibers 140 of the photonic adaptor 100 and optical waveguides of the optoelectronic substrate for transferring light between the optical waveguides of the optoelectronic substrate and the optical fibers 140 of the photonic adaptor 100.

FIG. 1B shows a cross-sectional view of the photonic adaptor 100 of FIG. 1A. The photonic adaptor 100 comprises a supporting substrate 110 that includes at least one groove 111 to receive the at least one alignment pin 150. The supporting substrate 110 may be embodied as a glass or silicone plate. The at least one alignment pin 150 is attached to the at least one groove 111 by means of an adhesive. The photonic adaptor further comprises a first covering substrate 120 being arranged above the first supporting substrate 110 such that the at least one alignment pin 150 is fixed between the supporting substrate 110 and the covering substrate 120. The covering substrate 120 may be embodied as a glass or silicone plate.

The supporting substrate 110 further includes a plurality of grooves 112. Each of the plurality of grooves 112 is configured to receive one of the plurality of the optical fibers 140. The grooves 112 are arranged in the supporting substrate 110 between the laterally arranged grooves 111. The grooves 111 for receiving the alignment pins 150 are provided deeper in the material of the supporting substrate 110 than the grooves 112 for receiving the optical fibers 140. The plurality of the optical fibers 140 are attached to the grooves 112 of the supporting substrate 110 by means of an adhesive.

The photonic adaptor 100 further comprises a covering substrate 130 being arranged on a surface S110 of the supporting substrate 110. The surface S110 of the supporting substrate 110 is directed to the covering substrate 120. The plurality of the optical fibers 140 are covered by the covering substrate 130. The supporting substrate 110 and the covering substrate 130 form a ferrule 10 of the photonic adaptor including the optical fibers 140. The covering substrate 130 may be embodied as a glass or silicone plate.

Figure 1C:
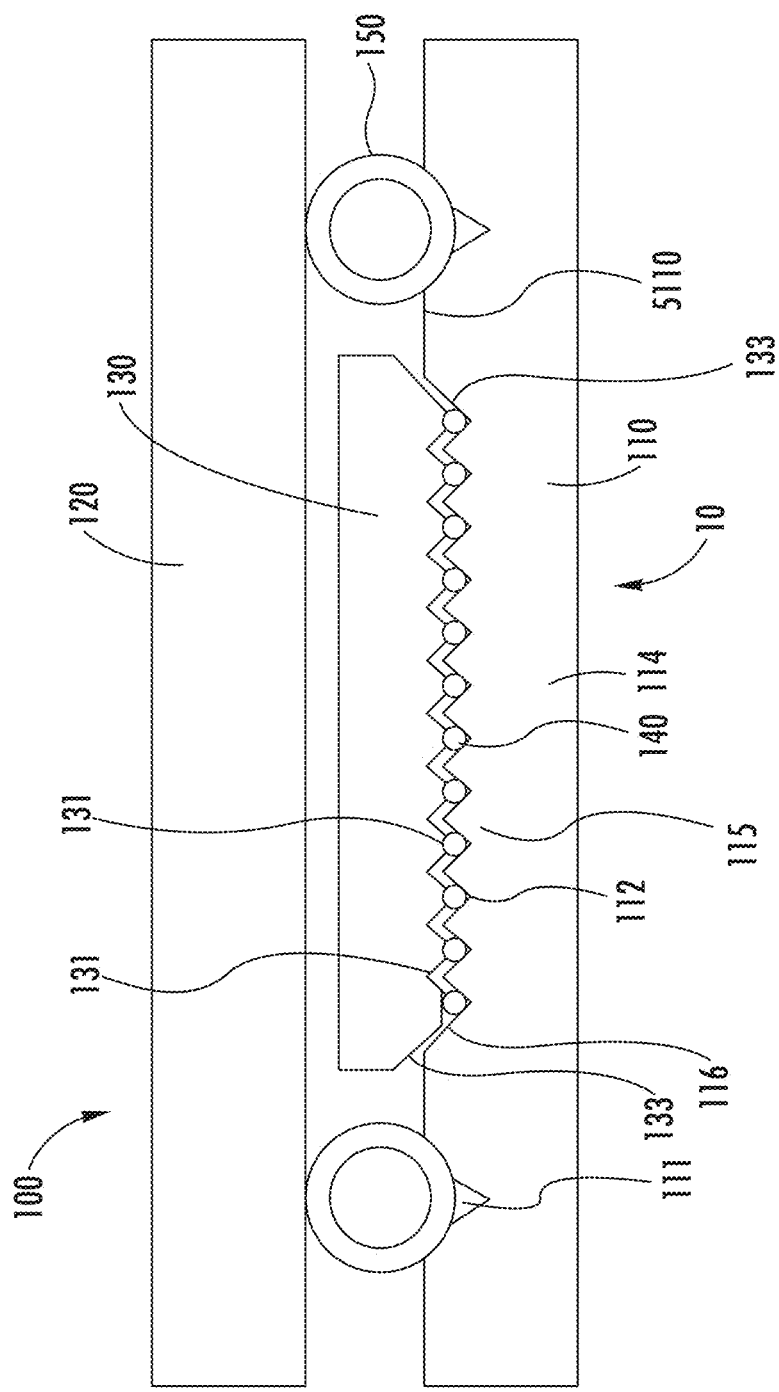
FIG. 1C shows a cross-sectional view of a second embodiment of the photonic adaptor for providing an interface between an optical connector and an optoelectronic chip.

According to the embodiment of FIG. 1B, the covering substrate 130 has a flat surface by which the optical fibers 140 are covered and fixed in the grooves 112 of the supporting substrate 100. FIG. 1C shows another embodiment of the photonic adaptor 100, wherein the covering substrate 130 has a plurality of grooves 131 being respectively separated by a flat surface portion 132. As illustrated in FIG. 1C, the covering substrate 130 is arranged on the surface S110 of the glass plate 310 such that the optical fibers 140 of the photonic adaptor 100 are covered by the flat surface portions 132 of the glass plate 330.

The supporting substrate 110 and the covering substrates 120 and 130 form a glass ferrule including the optical fibers 140 with attached alignment pins 150. Such a subassembly allows a modular approach for fiber chip coupling. Basically MTP-ferrules of an optical connector can be attached on the side 101 of the photonic adaptor, and a face side of an optoelectronic substrate/chip can be attached on the other side 102 of the photonic adaptor 100. The grooves 112 enable to align the optical fibers 140 precisely relative to the alignment pins 150.

The supporting substrate 110 and the covering substrates 120, 130 may be configured as glass plates. According to the embodiment shown in FIG. 1C, the area 115 of the grooves 112 is lowered in the surface S110 of the supporting substrate 110. The lowered area 115 including the grooves 112 has at both sides a slanted surface 116. The covering substrate 130 has laterally arranged slanted surfaces 113 which abut on the slanted surfaces 116 of the supporting substrate 110.

According to the covering concept shown in FIG. 1B, the surface of the covering substrate 130 is flat to simply fix the optical fibers 140 into the v-grooves 112 of the supporting substrate 110. The covering substrate 120 has no v-grooves and is glued above the assembly of the supporting substrate 110 and the covering substrate 330. The main function of the covering substrate 120 is to fix the alignment pins 150 in their v-grooves 111. All the covering substrates are glued together to build the common ferrule with the optical fibers 140 and the fixed alignment pins 150.

Figure 2:
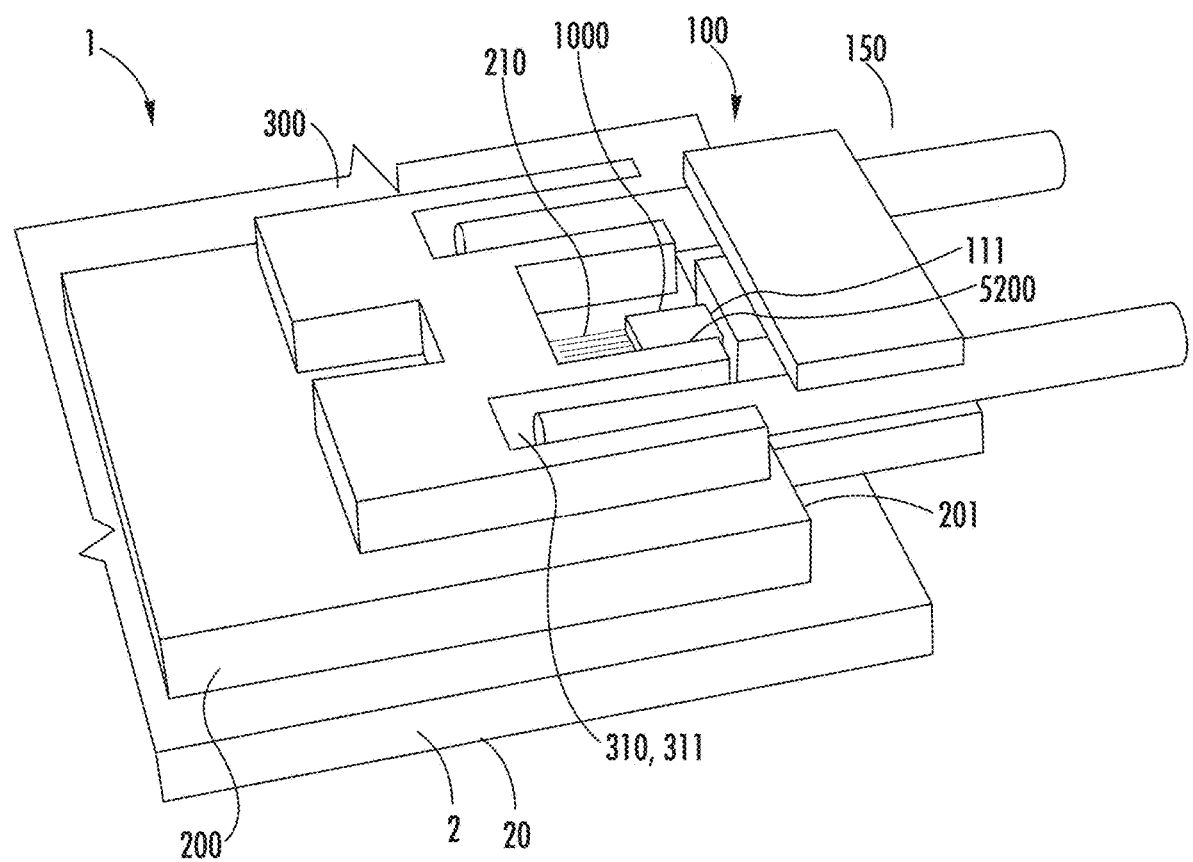
FIG. 2 shows an embodiment of an optoelectronic assembly for mounting to a carrier substrate.

FIG. 2 shows an embodiment of an optoelectronic assembly 1 for mounting to a carrier substrate 2. The carrier substrate 2 may be configured as a printed circuit board 20. The optoelectronic assembly 1 comprises the photonic adaptor 100 shown in FIGS. 1A and 1B and an optoelectronic substrate 200, for example an optoelectronic chip. The optoelectronic substrate 200 may comprise a photonic integrated circuit (PIC) or a planar lightwave circuit (PLC). The optoelectronic circuit 200 includes optical waveguides 210. A respective front face 211 of the optical waveguides 210 terminates at a face side 201 of the optoelectronic circuit 200. A mode field converter/mode field expander 1000 may be arranged over a portion of the optical waveguides 210 to provide a mode field conversion when transferring light between the optical fibers 140 of the photonic adaptor and the optical waveguides 210 of the optoelectronic substrate 200.

The optoelectronic assembly 1 further comprises a coupling and alignment layer 300 that includes a mating structure 310. The coupling and alignment layer 300 may be made of glass or metal. The mating structure 310 is configured to receive the at least one alignment pin 150 of the photonic adaptor 100 to mate the photonic adaptor 100 to the optoelectronic substrate 200. The mating structure 310 and the at least one alignment pin 150 are formed such that, in a mated state of the photonic adaptor 100 and the optoelectronic substrate 200, as shown in FIG. 2, the optical fibers 140 of the photonic adaptor 100 and the optical waveguides 210 of the optoelectronic substrate 200 are aligned to each other for transferring light between the optical fibers 140 and the optical waveguides 210.

The at least one alignment pin 150 is arranged in the mating structure 310 of the coupling and alignment layer 300 and may be secured to the mating structure 310 of the coupling and alignment layer using adhesives, soldering or laser welding. The mating structure 310 is formed by at least one cut-out region 311 in the material of the coupling and alignment layer 300. According to the embodiment shown in FIG. 2, the coupling and alignment layer 300 is arranged on top of the optoelectronic substrate 200.

FIG. 1A shows the photonic adaptor 100 in its basic form comprising a two-layer sandwiched V-groove assembly of the supporting substrate 110 and the covering substrates 120, 130. Both front sides 141 and 142 of the optical fibers 140 are polished at the face sides 113, 114 of the supporting substrate 110. The precision of the arrangement of the alignment pins 150 and the optical fibers 140 is given by the grooves 111 and 112 of the supporting substrate 110 defining the structures for fitting the optical fibers 140 and the alignment pins 150. The structural precision is typically in the sub-micrometer range.

According to the embodiments of the photonic adaptor 100 shown in FIGS. 1A to 1C, a center axis of the at least one alignment pin 150 and a respective center axis of the optical fibers 140 are arranged with an offset to each other in a direction perpendicular to the respective center axis of the at least one alignment pin 150 and the optical fibers 140. It is important that the fiber cores have an offset relative to the alignment pins, because the alignment pins do not engage with an edge of the optoelectronic substrate, but engage with the coupling and alignment layer 300. The offset needs to be adjusted and controlled to several dimensions, for example v-groove, v-groove depth, etc. In this v-groove constellation the offset is very limited.

In particular, the embodiment shown in FIG. 1C provides an improved variation of the offset. According to this embodiment the supporting substrate 110 as well as the covering substrate 130 have v-groves 112, 131 to allow a better variation of the fiber core to pin's surface offset.

During the assembly process the optical fibers 140 are inserted in the grooves 112 of the supporting substrate 110 and glued into place using the inner lid structure of the covering element 130 to form the ferrule 10. Then the sub-assembly/ferrule 10 will go into two-side polishing so that the front sides 141 and 142 of the optical fibers are polished. The last assembly step is the insertion of the alignment pins 150 into the two outer grooves 111 of the supporting substrate 110 and the attachment of the covering substrate 120 to keep the alignment pins 150 in place. The length of the alignment pins 150 can be customized.

Attachment of the photonic adaptor 100 to the optoelectronic substrate 200 can be done using either active or passive alignment techniques. FIG. 2 shows an example for coupling the photonic adaptor 100 to the optoelectronic substrate 200 by an active alignment procedure using active feedback information by reading out a signal transferred via the optical fibers 140 and the optical waveguides 210, and adjusting the position of the photonic adaptor 100 in relation to the optoelectronic substrate 200 accordingly to maximize the coupling efficiency. The mating structure 310 of the coupling and alignment layer 300 on top of the surface of the optoelectronic substrate 200 is used as a reference surface for attaching the alignment pins 150 using either adhesive bonding, soldering or laser welding techniques.

For the components of the photonic adaptor 100, the optoelectronic substrate 200 and the coupling and alignment layer 300, low CTE materials are used. According to a possible embodiment, the optoelectronic substrate 200 may comprise a silicone substrate, for example a silicone surface PLC, and the photonic adaptor 100 may comprise borosilicate glass plates having very similar thermal expansion coefficients and will create a very small differential offset change along the horizontal axis, for example, of only 84 nm over a temperature range of 70° C.

Regarding the alignment pins 150, pins made of Kovar show an offset in the vertical axis that is less than 122.5 nm. The influence of the adhesive, solder or laser weld in the cut-out regions 311 of the mating structure 310 has not been taken into account. Nevertheless, due to the fact that the alignment pins 150 are attached to the sidewalls of the mating structure 310, any shrinkage or expansion of the bond should be compensated by design since the occurring force vectors are pointing towards opposite directions.

From an assembly reliability point of view, either soldering or laser welding of the alignment pins 150 to the mating structure 310 promise the best performance at high temperature assembly processes, for example high temperature reflow processes. If the alignment pins 150 are secured in the mating structure 310 by means of an adhesive, the adhesive composition may be chosen to survive a reflow soldering temperature of around 260° C. for a period of time to maintain precision for low loss coupling.

Figure 3:
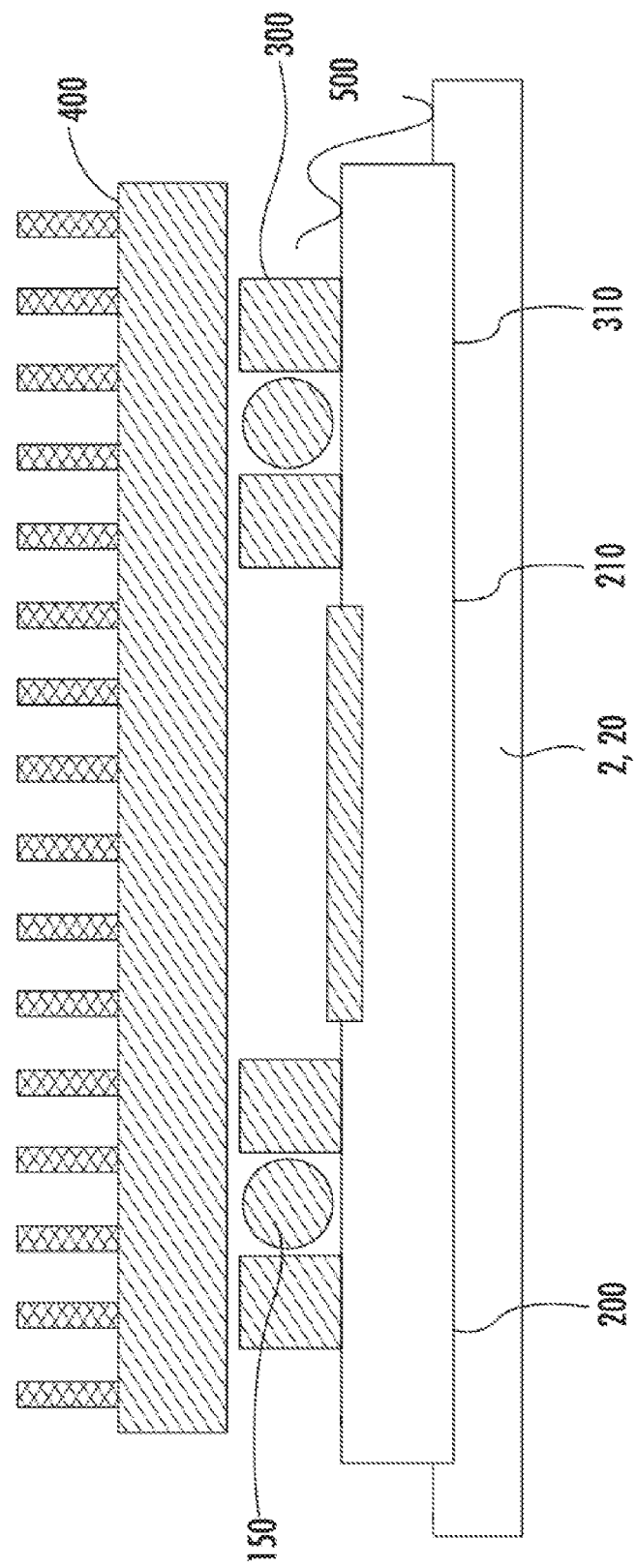
FIG. 3 shows a cross-sectional view of a first embodiment of an optoelectronic assembly mounted on a carrier substrate.

FIG. 3 shows a cross-sectional view of the optoelectronic assembly 1 of FIG. 2. The optoelectronic substrate 200 may include a planar lightwave circuit with an area where the optical waveguides 210 are provided, the coupling and alignment layer 300 with the mating structure 310 and the photonic adaptor 100 with the alignment pins 150 being inserted in the mating structure 310. The optoelectronic assembly further comprises a heat spreader 400 being mounted on top of the coupling and alignment layer 300.

Once the optoelectronic assembly 1 has been completely assembled, as shown in FIGS. 2 and 3, the optoelectronic substrate 200 together with the photonic adaptor 100 is attached to the carrier substrate 2, for example a printed circuit board 20. FIG. 3 illustrates a wire bonding attachment using wire bonds 500 between the optoelectronic substrate 200 and the carrier substrate 2. If wire bonds 500 are used for the electrical interconnects between the optoelectronic substrate 200 and the carrier substrate 2, the material of the coupling and alignment layer 300 may be a low CTE metal, for example, Kovar, having a CTE of about 5 ppm/K. This would allow for low thermal expansion and thus low mechanical stress during later assembly processes as well as providing a good thermal conductance to the top-mounted heatsink or heat spreader 400.

The optoelectronic substrate 200 may be attached to the carrier substrate 2 using epoxy. The photonic adaptor 100 and the coupling and alignment layer 300 have been preassembled and do not act as a thermal conductor to the heat spreader 400 which is mounted on top of the assembly after wire bonding the electrical interconnects from the optoelectronic substrate 200 to the carrier substrate 2.

Figure 4:
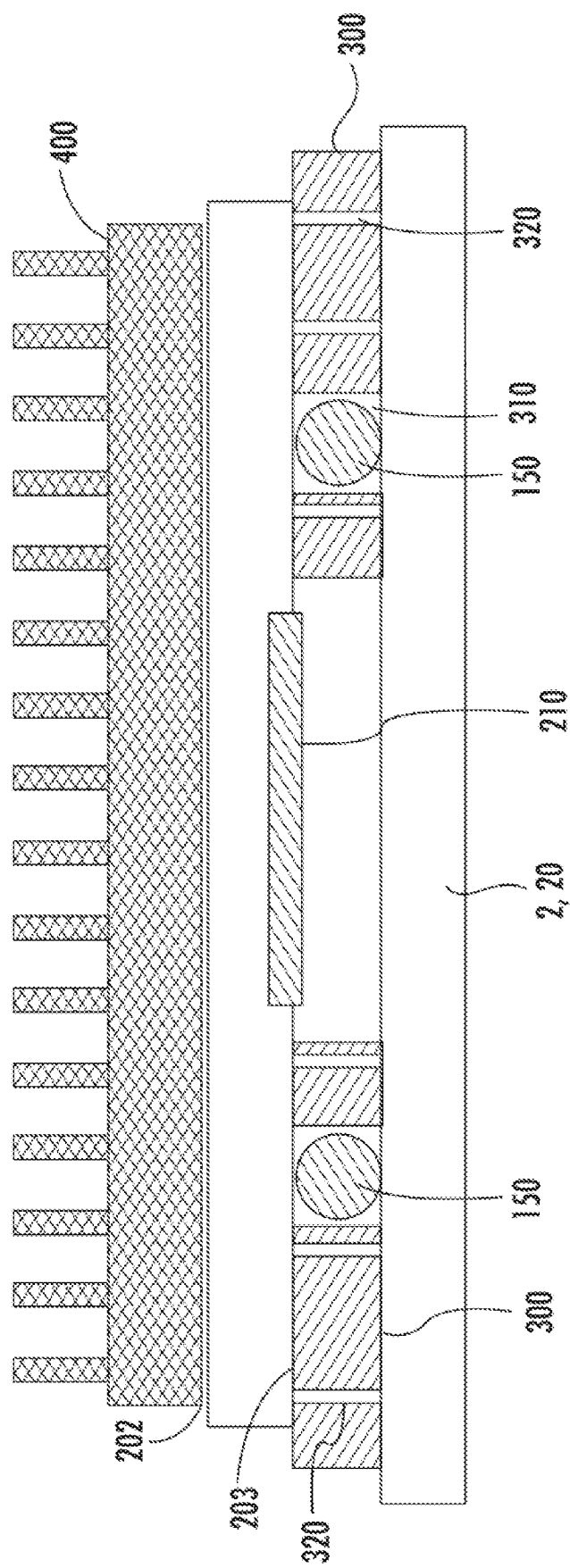
FIG. 4 shows a cross-sectional view of a second embodiment of an optoelectronic assembly mounted on a carrier substrate.

FIG. 4 shows another embodiment of the optoelectronic assembly 1 comprising the optoelectronic substrate 200, the coupling and alignment layer 300 and the photonic adaptor 100 coupled to the optoelectronic substrate 200 by means of the alignment pins 150. According to the embodiment shown in FIG. 4, the optoelectronic substrate 200 together with the coupling and alignment layer 300 is flip-chip mounted on top of the carrier substrate 2. The heat spreader 400 is directly mounted to a surface 202, i.e. the backside, of the optoelectronic substrate 200. The coupling and alignment layer 300 is arranged on a surface 203 of the optoelectronic substrate 200.

According to the embodiment shown in FIG. 4, the coupling and alignment layer 300 with the mating structure 310 is made of glass. The coupling and alignment layer 300 may comprise metallized side-walls in the cut-out regions 311 for receiving the alignment pins 150 of the photonic adaptor 100. Electrical interconnects between the optoelectronic substrate 200 and the carrier substrate 2 are realized by metallized through-glass vias 320 being provided in the coupling and alignment layer 300.

If the optoelectronic assembly is flip-chip mounted to the carrier substrate 2, the material of the coupling and alignment layer 300 is preferably a glass substrate with metallized through-glass vias with a minimum thickness as the diameter of the alignment pins 150 of the photonic adaptor 100. Electrical signals and power are supplied through the coupling and alignment layer 300 to the carrier substrate 2. The cut-out areas 311 for receiving the alignment pins 150 can be metallized on the sidewalls to allow for all three possible assembling techniques, i.e. adhesive bonding, soldering and laser welding.

Figure 5:
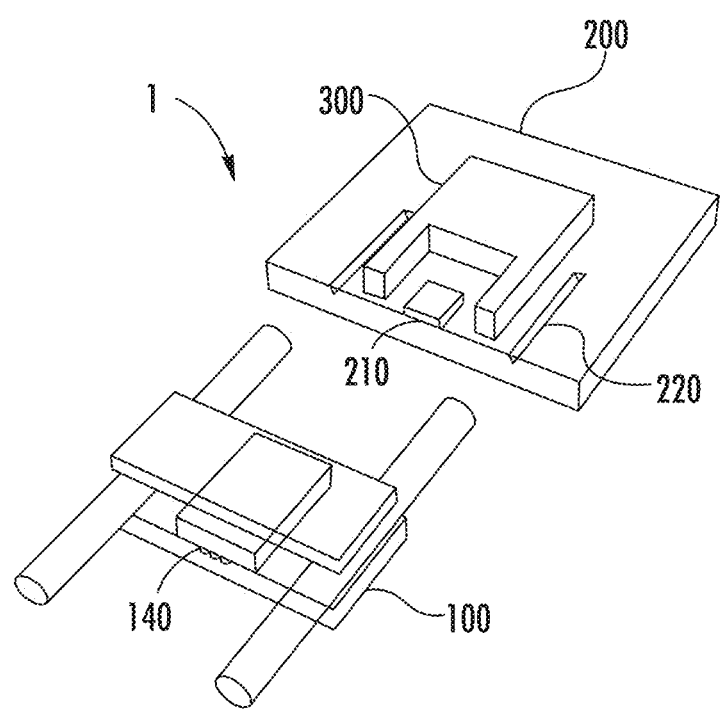
FIG. 5 shows an embodiment of a photonic adaptor and an optoelectronic substrate with a mating structure arranged thereon in an unmated state.

FIG. 5 shows an embodiment of the optoelectronic assembly 1 in an unmated state, before coupling the photonic adaptor 100 to the optoelectronic substrate 200. In order to align the photonic adaptor 100 and, in particular, the optical fibers 140 of the photonic adaptor to the optical waveguides 210 of the optoelectronic substrate 200, an alignment structure 220 is provided in the material of the optoelectronic substrate 200 at the top surface of the optoelectronic substrate 200.

The alignment structure 220 may be used for passive alignment as an alternative to the above-described active alignment. For passive alignment, precision reference structures, such as the alignment structure 220 may be implemented on the optoelectronic substrate 200 for receiving and aligning the alignment pins 150 so that the optical fibers 140 are sufficiently aligned to the optical waveguides 210 for light coupling with low loss and no processing of feedback information is necessary. The precision datum/alignment structure 220 may be configured as at least a V-groove for receiving the at least one alignment pin, the V-groove being integrated in the material at the top surface of the optoelectronic substrate 200 or other hard stops co-mounted or integrated into the optoelectronic substrate 200.

Figure 6A:
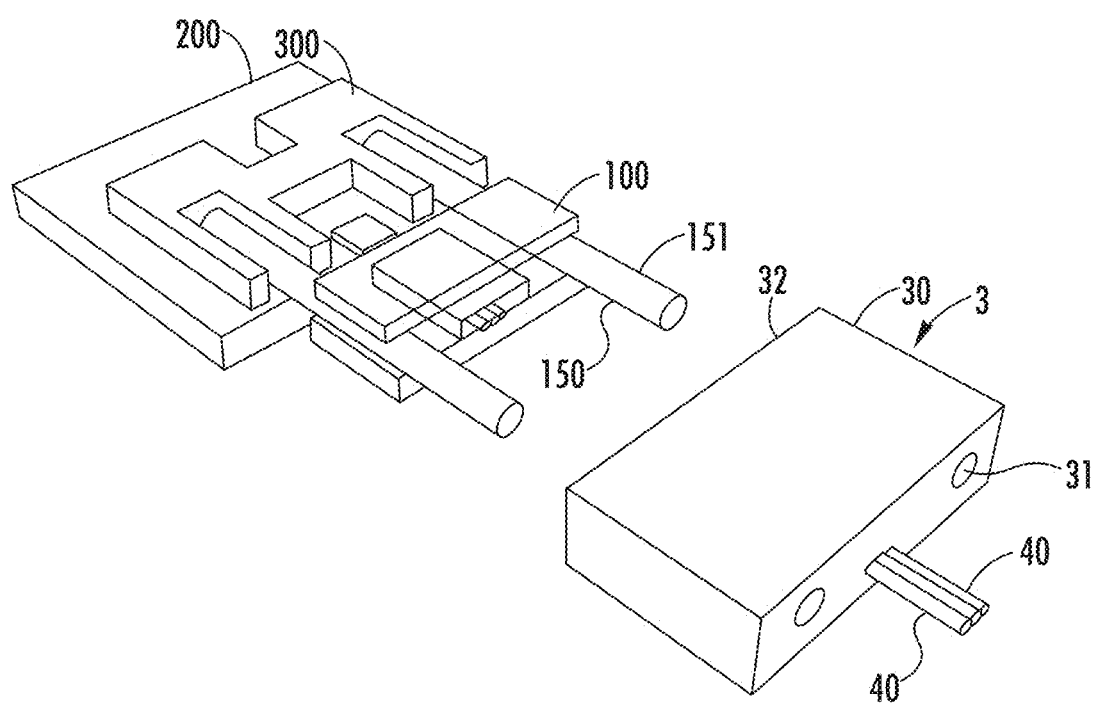
FIG. 6A shows an embodiment of an optoelectronic assembly and a ferrule of an optical connector in an unmated state.

In order to connect an optical cable including optical fibers to the optoelectronic assembly 1, the optical cable is terminated by an optical connector. FIG. 6A shows the optoelectronic assembly 1 comprising the photonic adaptor 100, the optoelectronic substrate 200 and the coupling and alignment layer 300 in the mated state and an optical connector 3 terminating optical fibers 40 of an optical cable 4. The optical connector 3 comprises a ferrule 30 comprising cavities 31.

Figure 6B:
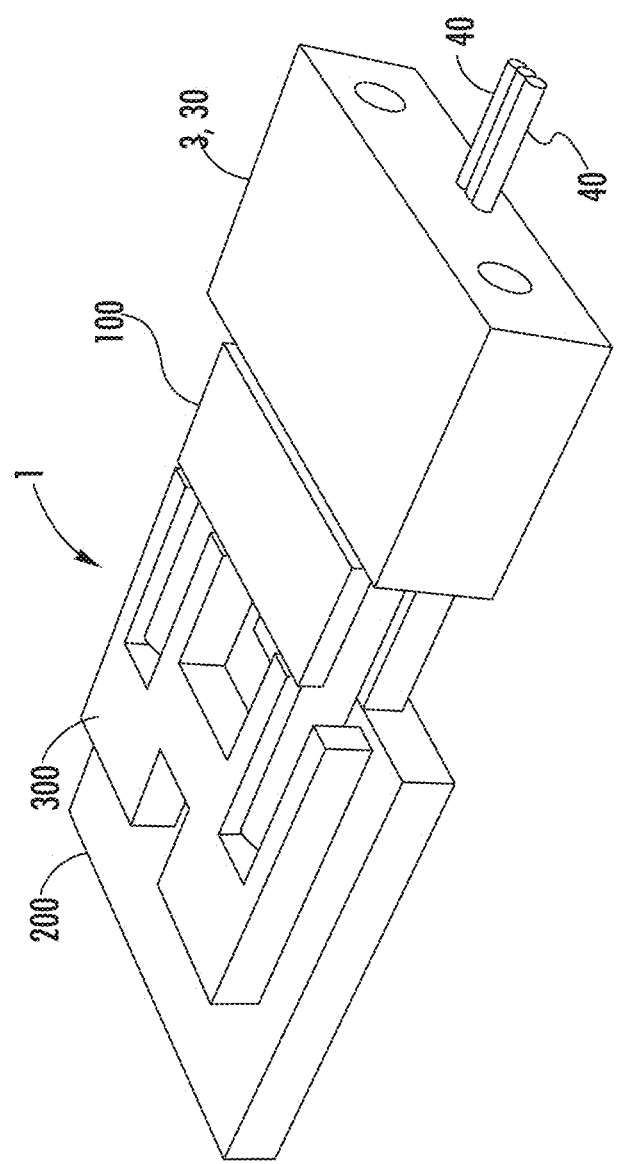
FIG. 6B shows an embodiment of an optoelectronic assembly and a ferrule of an optical connector in a mated state.

FIG. 6B shows the optical connector 3 with the ferrule 30 mechanically connected to the optoelectronic assembly 1. The portions 151 of the alignment pins 150 are inserted in the cavities 31 of the ferrule 30 to align the optical fibers 40 of the optical cable 4 to the optical fibers 140 of the photonic adaptor 100. The ferrule 30 is designed for matching the respective position of the alignment pins 150. In particular, the ferrule 30 and the photonic adaptor 100 are designed to make physical contact between the optical fibers 40 included in the ferrule 30 and the optical fibers 140 of the photonic adaptor 100. A certain mating force depending on the number of optical fibers and quality of the polished surface is necessary to ensure proper contact of all the optical fibers 40 to the corresponding mating part.

Figure 7A:
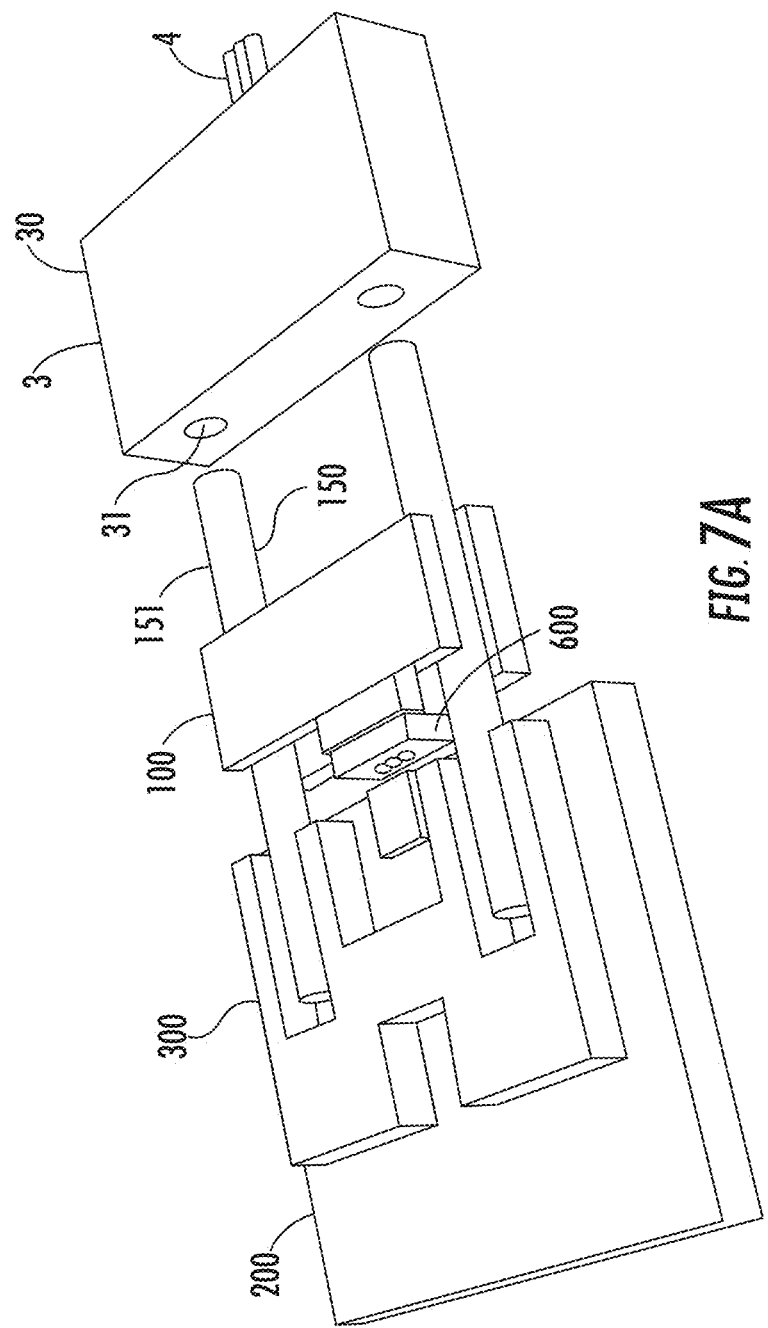
FIG. 7A shows another embodiment of an optoelectronic assembly with a ferrule of an optical connector in an unmated state.
Figure 7B:
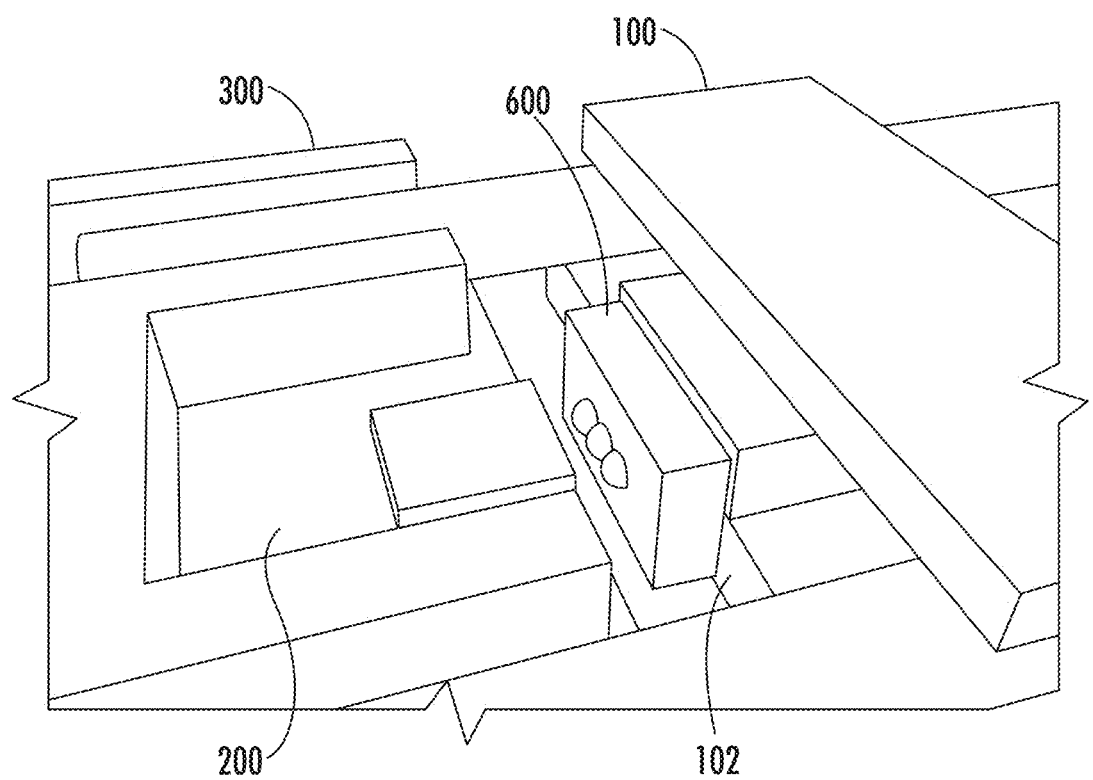
FIG. 7B shows an enlarged view of a lensed coupling between a photonic adaptor and an optoelectronic substrate.

FIGS. 2 to 6B show embodiments of the optoelectronic assembly 1, wherein the photonic adaptor 100 makes physical contact with the edge of the optoelectronic substrate 200 for a direct coupling of the optical fibers 140 of the photonic adaptor 100 to the optical waveguides 210 of the optoelectronic substrate 200. FIGS. 7A and 7B illustrate another embodiment of the optoelectronic assembly 1, where an optical interface between the photonic adaptor 100 and the optoelectronic substrate 200 is realized using optical lenses 600 to match a small mode field diameter of the optical waveguides 210 of the optoelectronic substrate, for example a planar lightwave circuit, to the larger mode field diameter of the optical fibers 140 of the photonic adaptor 100. The optical lenses 600 may be embodied as microlenses. The optical lenses 600 can be attached to the photonic adaptor 100 in front of the front sides of the optical fibers 140 by using a thin epoxy/adhesive line in between the polished face side 102 of the photonic adaptor 100 and the optical lens array 600.

FIGS. 8A to 11B show embodiments of the optoelectronic assembly 1, wherein the coupling and alignment layer 300 is not formed in a "one-piece design", i.e. not as a continuum or continuous layer arranged on the optoelectronic substrate 200 without any interruption as shown for the coupling and alignment layer 300 of the previous embodiments. According to the embodiments the optoelectronic assembly 1 shown in FIGS. 8A to 11B, the coupling and alignment layer 300 is formed by individual alignment pin receivers 330a, 330b. The alignment pin receivers 330a, 330b respectively have a cavity 331 to receive the alignment pins 150 of the photonic adaptor 100. The cavities 331 may be U-shaped.

The alignment pin receivers 330a, 330b have an inside width of their cavity 331 that is closely matched to the outer diameter of the alignment pins 150. The design of the individual alignment pin receivers 330a, 330b ensures that gaps between the alignment pins 150 and the alignment pin receivers 330a, 330b are small, minimizing the likelihood of shifts during assembly. The distance between which the alignment pin receivers 330a, 330b are mounted on the top surface of the optoelectronic substrate 200 may be adapted to the pitch between the alignment pins 150, whereas a continuous alignment and coupling layer has to be fabricated with high precision so that the distance between the slots of the mating structure to receive the alignment pins 150 exactly fits to the distance between the alignment pins 150. A further advantage of using the individual alignment pin receivers 330a, 330b over a simple side block positioned adjacent to the alignment pins 150 is that the alignment pin receivers track with the lateral motion of the photonic adaptor during active alignment power peaking.

The photonic adaptor 100 is designed as shown in FIG. 1. The optical waveguides 210 are arranged in the top surface of the optoelectronic substrate 200 and are configured as a waveguide array. FIGS. 8A to 11B further show a pitch converter substrate 1100 that is attached in front of the front sides 142 of the optical fibers 140 to provide an optical bridge between the optical fibers 140 of the photonic adaptor 100 and the optical waveguides 210 of the optoelectronic substrate 200.

FIGS. 8A, 8B and 9A, 9B show embodiments of the optoelectronic assembly 1 respectively in the unmated and mated state. The alignment pin receivers 330a, 330b are embodied as glass blocks. These glass blocks can be fabricated by precision glass redraw processes, where micrometer-level tolerances on fabricated surfaces are possible.

Figure 8A:
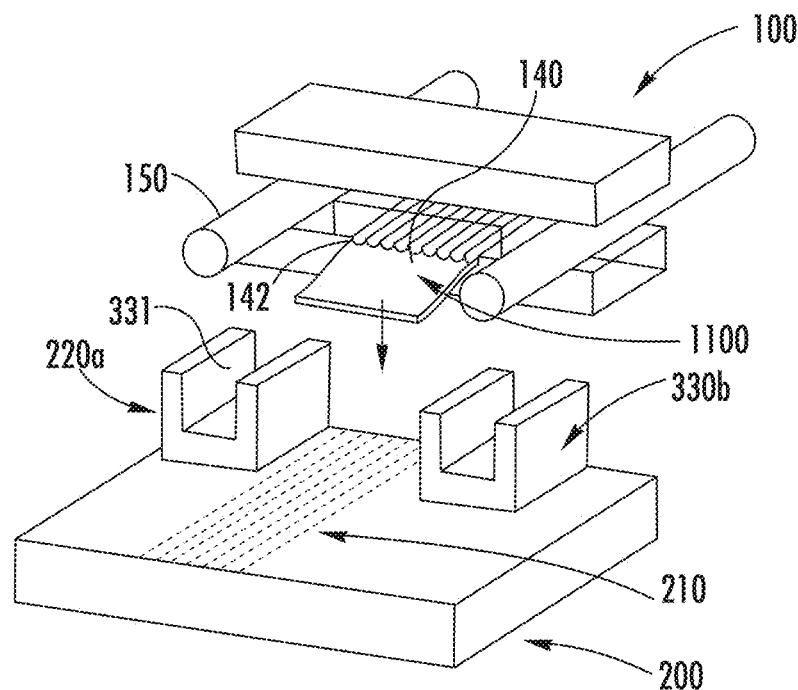
FIGS. 8A and 8B illustrate method steps for manufacturing an optoelectronic assembly using alignment pin receivers made of glass and mounted on the optoelectronic assembly in a first orientation for bonding a photonic adaptor to an optoelectronic substrate.
Figure 8B:
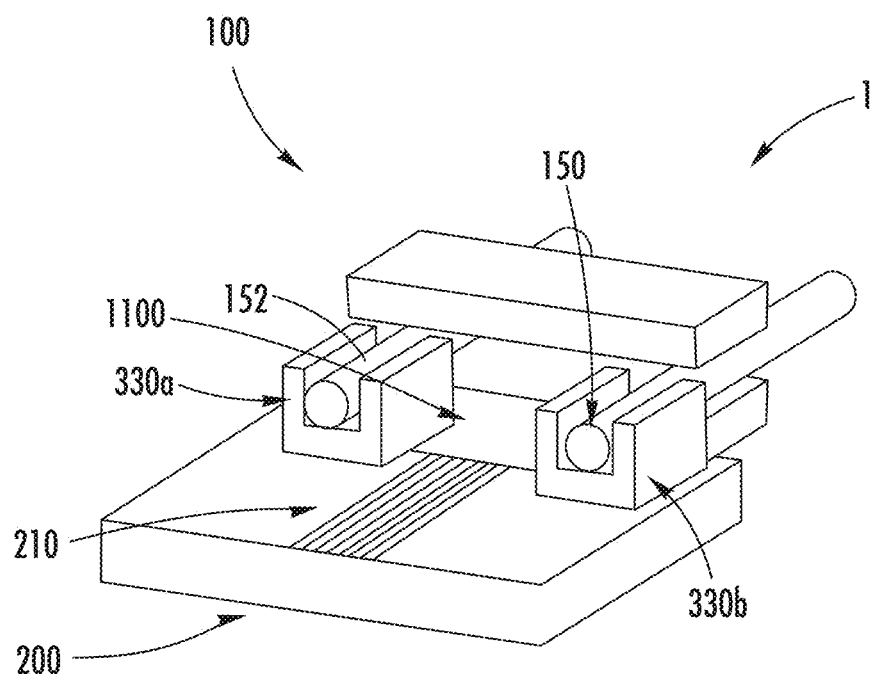
Figure 9A:
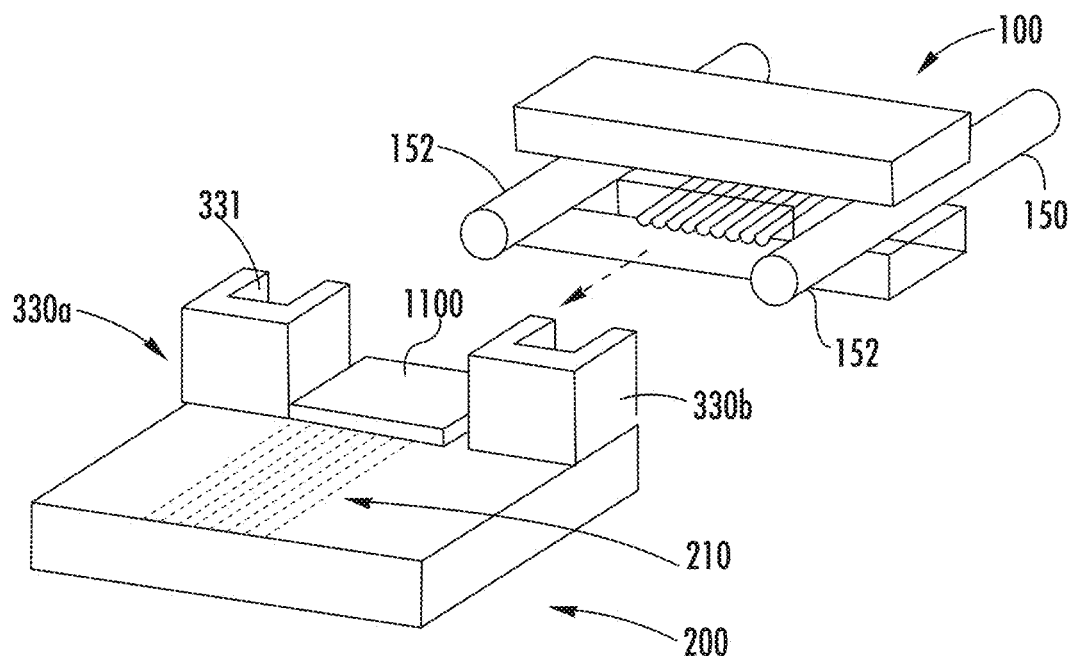
FIGS. 9A and 9B illustrate method steps for manufacturing an optoelectronic assembly using alignment pin receivers made of glass and mounted on the optoelectronic assembly in a second orientation for bonding a photonic adaptor to an optoelectronic substrate.
Figure 9B:
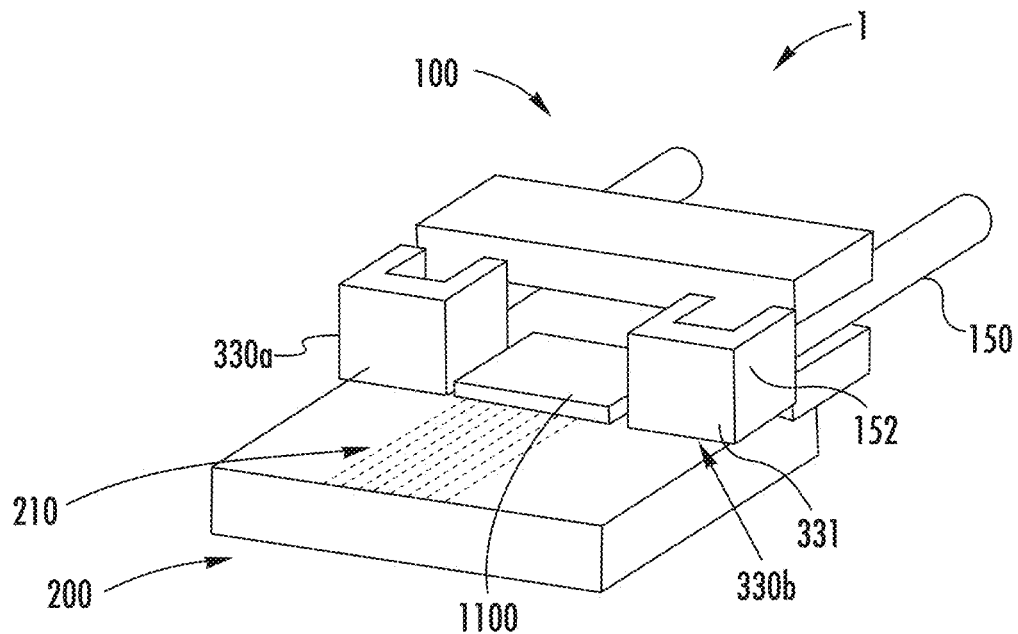

FIGS. 8A and 8B show an embodiment of the optoelectronic assembly 1, where the alignment pin receivers 330a, 330b are oriented upward with its respective cavity 331 on the surface of the optoelectronic substrate 200. FIGS. 9A and 9B show another configuration. The individual glass blocks of the pin receivers 330a, 330b are tipped over so that a longitudinal axis of the cavities 331 is arranged perpendicular to the top surface of the optoelectronic substrate 200. The U-shaped diameter of the cavities lies in the plan of the optoelectronic substrate 200. The configuration shown in FIGS. 9A and 9B may increase the stiffness of the thin vertical elements 330a, 330b that attach to the alignment pins 150.

In order to mount the alignment pin receivers 330a, 330b on the top surface of the optoelectronic substrate 200, a thin adhesive layer is applied between the surface of the optoelectronic substrate 200 and the surface of the alignment pin receivers 330a, 330b being in contact with the top surface of the optoelectronic substrate 200. In order to fix the portions 152 of the alignment pins 150 in the cavities 331 of the alignment pin receivers 330a, 330b, adhesive is applied within the cavities 331 and cured to retain the alignment pins 150 in its target location. At the same time, the thin adhesive layer between the alignment pin receivers 330a, 330b and the top surface of the optoelectronic substrate 200 is cured to fix the alignment pin receivers 330a, 330b on the optoelectronic substrate 200 in the positions shown in FIGS. 8A to 9B.

According to the embodiment of the optoelectronic assembly shown in FIGS. 8A and 8B the portions 152 of the alignment pins 150 are inserted into the cavities 331 of the alignment pin receivers 330a, 330b from above. According to the embodiment of the optoelectronic assembly 1 shown in FIGS. 9A and 9B the portions 152 of the alignment pins 150 are inserted sidewards in the cavities 331 of the alignment pin receivers 330a, 330b.

FIGS. 10A, 10B and 11A, 11B show other embodiments of the optoelectronic assembly 1, where the alignment pin receivers 330a, 330b are respectively configured as a metal block that is arranged on the top surface of the optoelectronic substrate 200.

Figure 10A:
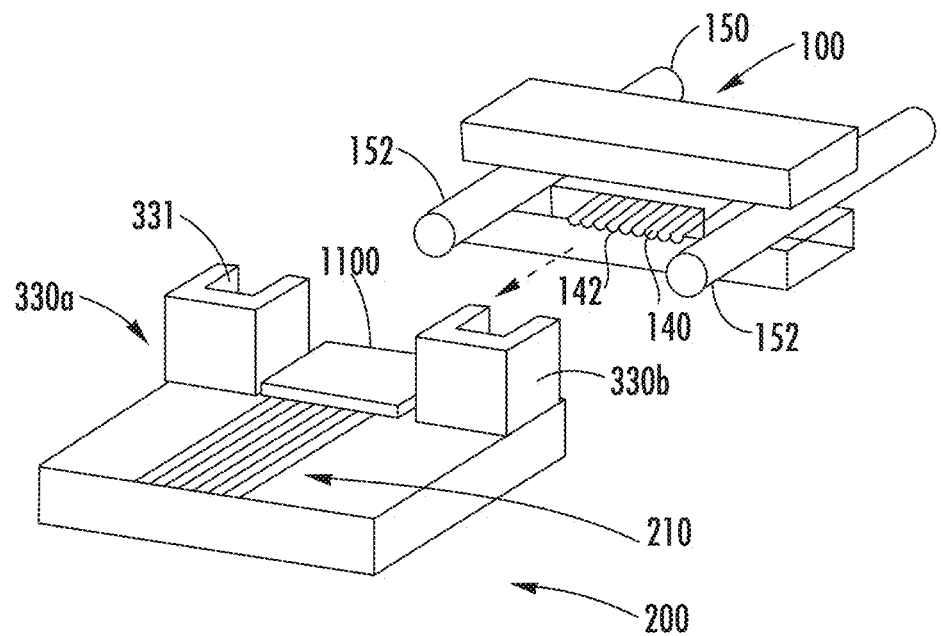
FIGS. 10A and 10B illustrate method steps for manufacturing an optoelectronic assembly using alignment pin receivers made of a metal and mounted on the optoelectronic assembly in a first orientation for bonding a photonic adaptor to an optoelectronic substrate.
Figure 10B:
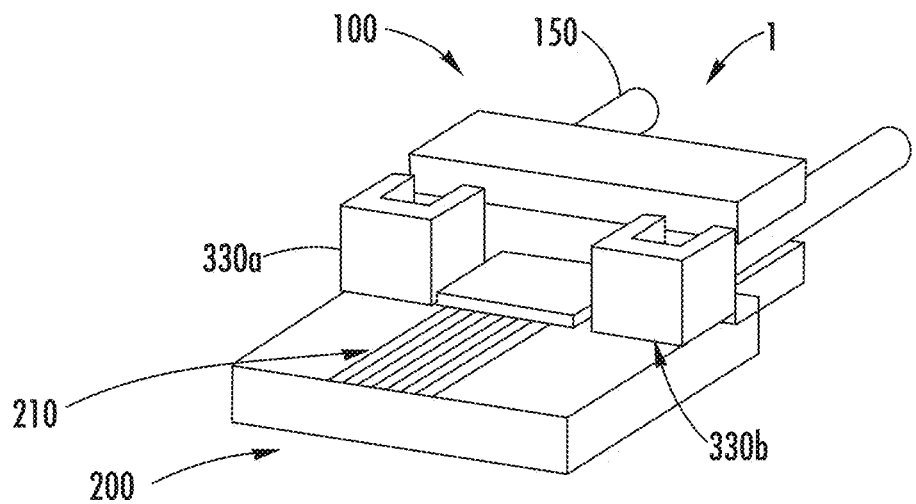

According to the embodiment shown in FIGS. 10A and 10B, the alignment pin receivers 330a, 330b are oriented on the top surface of the optoelectronic substrate 200 so that a longitudinal axis of the cavities 331 is oriented perpendicular to the top surface of the optoelectronic substrate 200. The portions 152 of the alignment pins 150 are inserted sidewards in the cavities 331 of the alignment pin receivers 330a, 330b.

Figure 11A:
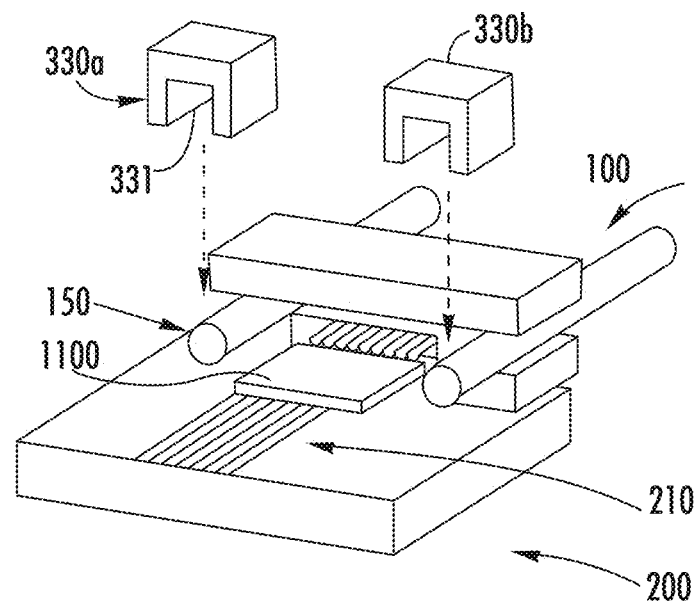
FIGS. 11A and 11B illustrate method steps for manufacturing an optoelectronic assembly using alignment pin receivers made of a metal and mounted on the optoelectronic assembly in a second orientation for bonding a photonic adaptor to an optoelectronic substrate.
Figure 11B:
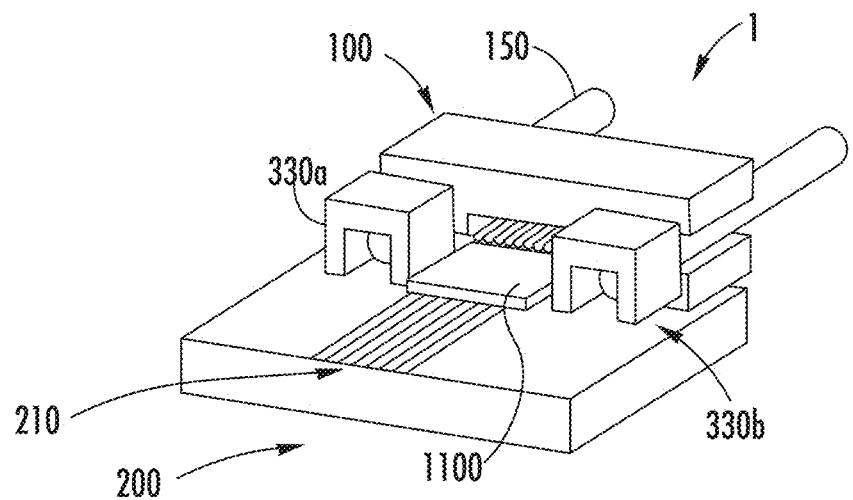

According to the embodiment shown in FIGS. 11A and 11B, the alignment pin receivers 330a, 330b are oriented on the top surface of the optoelectronic substrate 200 so that the respective cavities 331 of the alignment pin receivers 330a, 330b are inverted downward forming a tunnel on the top surface of the optoelectronic substrate 200 to receive the portions 152 of the alignment pins 150. After having aligned the optical fibers 140 of the photonic adaptor 100 to the optical waveguides 210 of the optoelectronic substrate 200, the alignment pin receivers 330a, 330b are placed from above to the top surface of the optoelectronic substrate 200 so that the portions 152 of the alignment pins 150 are received in the respective cavities 331 of the alignment pin receivers 330a, 330b, as shown in FIG. 11A.

In order to fix the alignment pin receivers 330a, 330b shown in FIGS. 10A to 11B on the top surface of the optoelectronic substrate 200 a thin adhesive layer is provided between the top surface of the optoelectronic substrate 200 and the respective surface of the alignment pin receivers 330a, 330b being directed to the top surface of the optoelectronic substrate 200. The configuration using individual metallic blocks for the alignment pin receivers allows the alignment pin receivers 330a, 330b to track with the motion of the alignment pins during lateral alignment processes prior to adhesive cure. According to another embodiment, the metallic alignment pin receivers 330a, 330b shown in FIGS. 10A and 10B may be pre-bent to from a spring structure that closely grips the portions 152 of the alignment pins 150 regardless of its vertical position at the time of final adhesive curing.

In all of the alignment pin receiver solutions shown in FIGS. 8A to 11B, the individual alignment pin receivers 330a and 330b could be held together by a low modulus material, for example silicone, or a thin arc member. This join member would allow the individual alignment pin receivers 330a and 330b to achieve the correct pitch of the alignment pins 150 while enabling small gaps between the alignment pin receivers and the alignment pins. The joining member would also simplify positioning of multiple alignment pin receivers during assembly by grouping them together. In this way, multiple alignment pin receivers could be coarsely positioned prior to precise active alignment using, for example, a single grip point on the joining member.

FIGS. 1 to 11B show embodiments of an optoelectronic assembly 1 with alignment pins 150 projecting from both face sides 101 and 102 of the photonic adaptor 100. This configuration of the photonic adaptor 100 allows to passively align the photonic adaptor 100 to the optoelectronic substrate 200. The following FIGS. 12A to 19C show embodiments of a photonic adaptor 100 and optoelectronic assembly 1, where the alignment pins are truncated at the face side 102 of the photonic adaptor. The optoelectronic substrate 200 does not comprise a coupling and alignment layer with a mating structure to receive the portion 152 of the alignment pins. The alignment pins 150 rather only extend over the face side 101 of the photonic adaptor by a portion 151 to couple and align an optical connector to the face side 101 of the photonic adaptor. Since the portions 152 of the alignment pins are truncated, the photonic adaptor 100 has to be optically coupled to the optoelectronic substrate 200 by using active alignment.

FIGS. 12A to 15B show embodiments of an optoelectronic assembly 1, wherein the photonic adaptor 100 and the optoelectronic substrate 200 are mechanically fixed by using an overlap sheet bonding technique. FIGS. 16 to 19C show embodiments of an optoelectronic assembly 1, wherein the photonic adaptor 100 is mechanically fixed to the optoelectronic substrate 200 by means of an edge bonding technique.

Figure 12A:
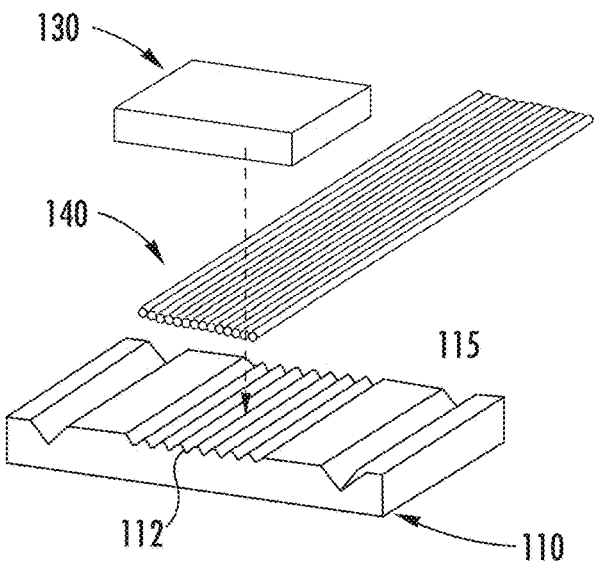
FIGS. 12A to 12C illustrate method steps for manufacturing a photonic adaptor applicable for evanescent coupling.
Figure 12B:
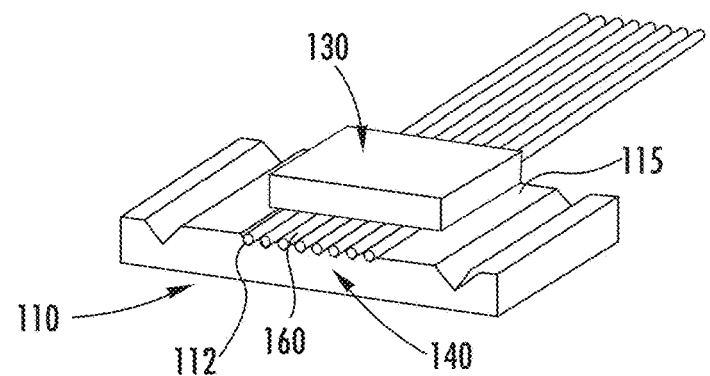
Figure 12C:
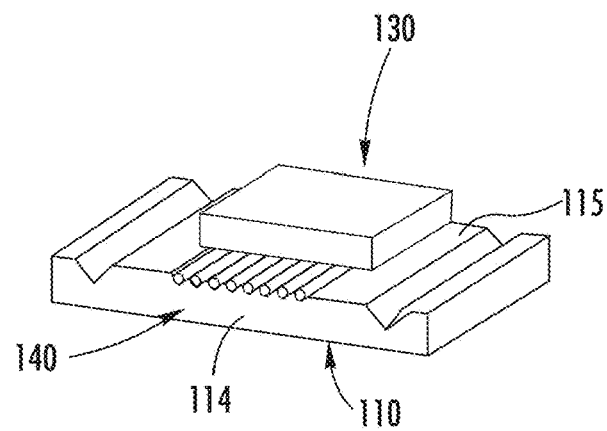

FIGS. 12A to 12C illustrate first manufacturing steps of an assembly process for a photonic adaptor using optical fibers 140 being configured as a so-called D-fiber array 160. The D-fiber array comprises the optical fibers 140 being arranged side-by-side in the grooves 112 of the supporting substrate 110, wherein a coating and cladding of the optical fibers 140 is removed. The optical fibers 140 are processed such that each optical fiber 140 has a flat upper face. The optical fibers of the D-fiber array are oriented in the grooves 112 of the supporting substrate 110 with their flat faces upward.

The optical fibers 140 of the D-fiber array 160 are held into the grooves 112 using an adhesive and a covering substrate 130 that is arranged above the optical fibers 140 of the D-fiber array. The covering substrate 130 may be configured as a thin glass cover sheet. The covering substrate 130 may be glued onto the surface 115 of the supporting substrate 110, as shown in FIG. 12B. After the D-fiber array 160 is fixed in the grooves 112 of the supporting substrate 110, the coated portion of the optical fibers 140 extending over the face side 101 of the photonic adaptor 100 is removed, and the exposed fiber cores at the face sides of the supporting substrate 110 are polished.

FIG. 12C shows the photonic adaptor 100 after removal of the coated portions of the optical fibers 140 of the D-fiber array 160. The covering substrate 130 is configured so that the D-fiber array 160 is only partially covered by the covering substrate 130, leaving the end of the D-fiber array 160 which is arranged close to the side face 114 of the supporting substrate 110 and is not covered by the covering substrate 130 exposed for subsequent evanescent coupling to the optical waveguides of the optoelectronic substrate.

Figure 13A:
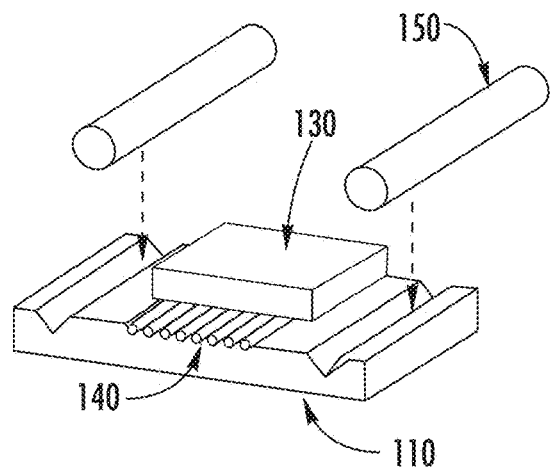
FIGS. 13A to 13C illustrate further method steps for manufacturing a photonic adaptor applicable for evanescent coupling.
Figure 13B:
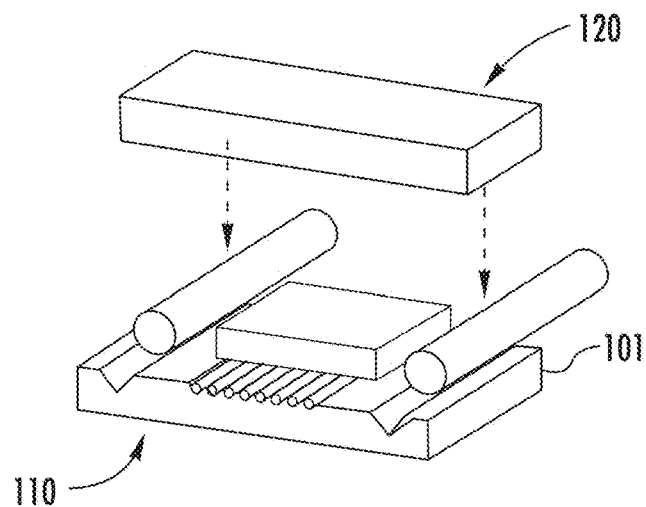
Figure 13C:
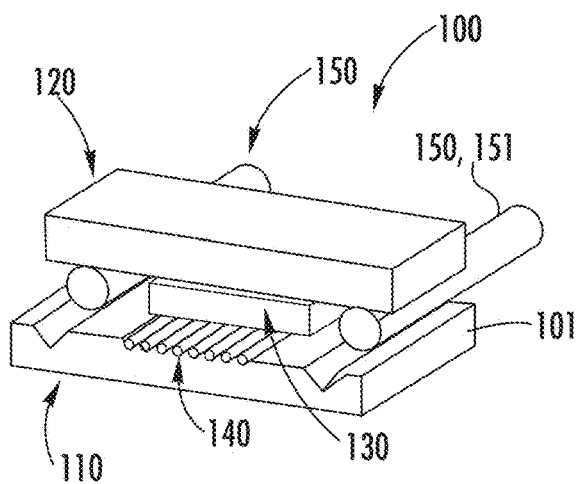

In the next assembly steps illustrated in FIGS. 13A to 13C shorted alignment pins 150, i.e. alignment pins that do not have the portion 152 extending over the face side 114 of the supporting substrate 110 are placed into the grooves 111 of the supporting substrate 110. After placing the alignment pins in the grooves 111, for example V-grooves, a top covering substrate 120 is placed on the alignment pins from above, as shown in FIG. 13B. The top covering substrate 120 may be configured as a glass plate. The top covering substrate 130 is held in place with an adhesive.

FIG. 13C shows the assembled photonic adaptor 100 with the D-fiber array 160 partially covered by the covering substrate 130 and with the alignment pins 150 being arranged in the grooves 111 of the supporting substrate 110 and fixed between the supporting substrate 110 and the covering substrate 120.

Figure 14A:
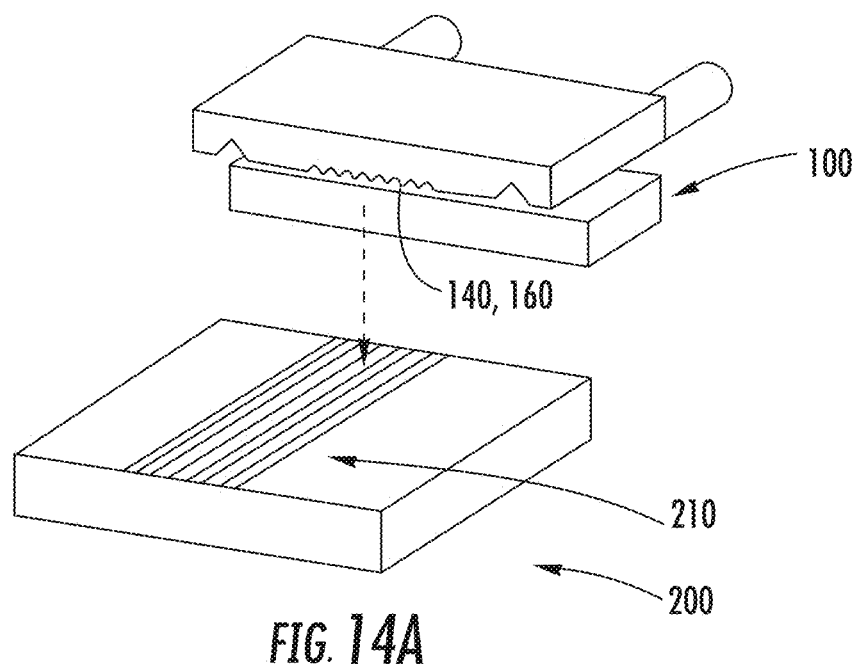
FIGS. 14A and 14B illustrate methods steps for manufacturing an optoelectronic assembly having evanescent coupling between optical fibers of a photonic adaptor and optical waveguides of an optoelectronic substrate.
Figure 14B:
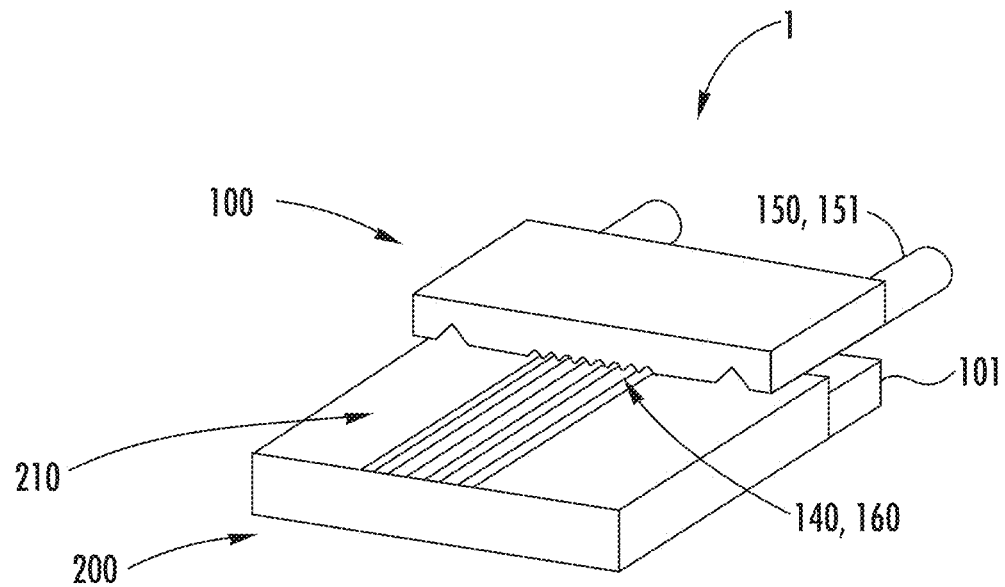

FIGS. 14A and 14B illustrate the attachment of the photonic adaptor 100 of FIG. 13C to the optoelectronic substrate 200, for example a substrate/chip comprising a planar lightwave circuit. The optoelectronic substrate 200 comprises optical waveguides 210 that are configured as a waveguide array provided in the upper surface of the optoelectronic substrate 200. As shown in FIG. 14A, the photonic adaptor 100 of FIG. 13C is inverted so that the flat surfaces of the optical fibers 140 of the D-fiber array 160 are oriented downward, as shown in FIG. 12A. Then, the photonic adaptor 100 is lowered down on the top surface of the optoelectronic substrate 200 and actively or passively aligned so that the fiber cores of the optical fibers 140 of the D-fiber array 160 are placed in a close distance above the optical waveguides 210 and are aligned with the optical waveguides 210 of the optoelectronic substrate 200.

The photonic adaptor 100 is fixed to the optoelectronic substrate 200 by providing an adhesive between the overlapping surface portion of the supporting substrate 110 and the upper surface of the optoelectronic substrate 200. The adhesive is applied away from the D-fiber array 160 and the surface waveguides 210 of the optoelectronic substrate 200 to hold the photonic adaptor 100 and the optoelectronic substrate together via a mechanically robust broad area joint.

Figure 15A:
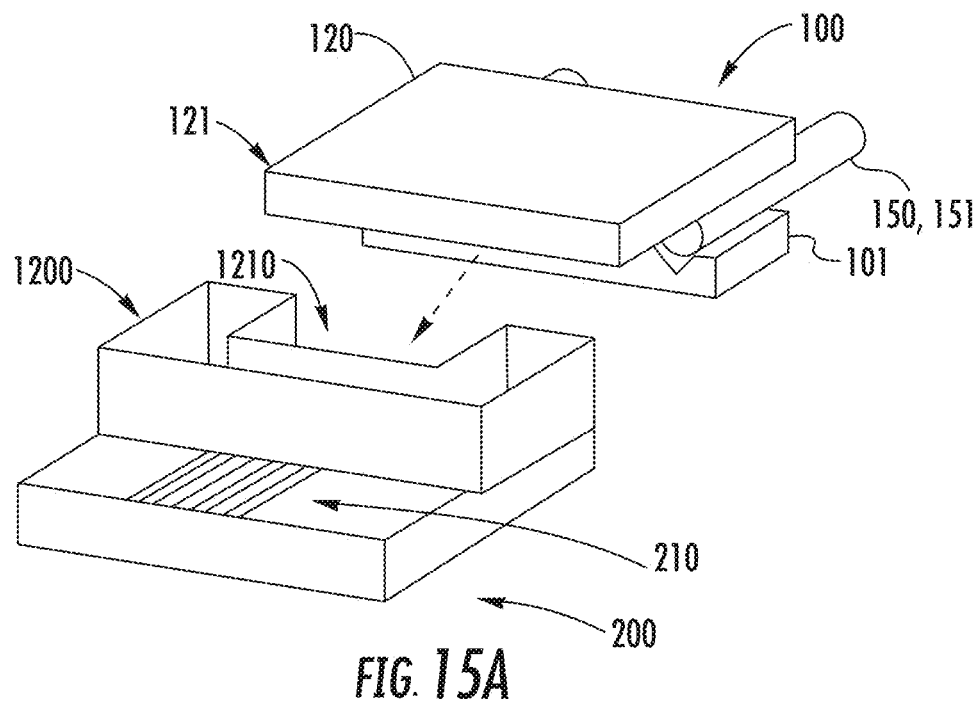
FIGS. 15A and 15B illustrate method steps for manufacturing an optoelectronic assembly using a glass spacer for bonding a photonic adaptor to an optoelectronic substrate.
Figure 15B:
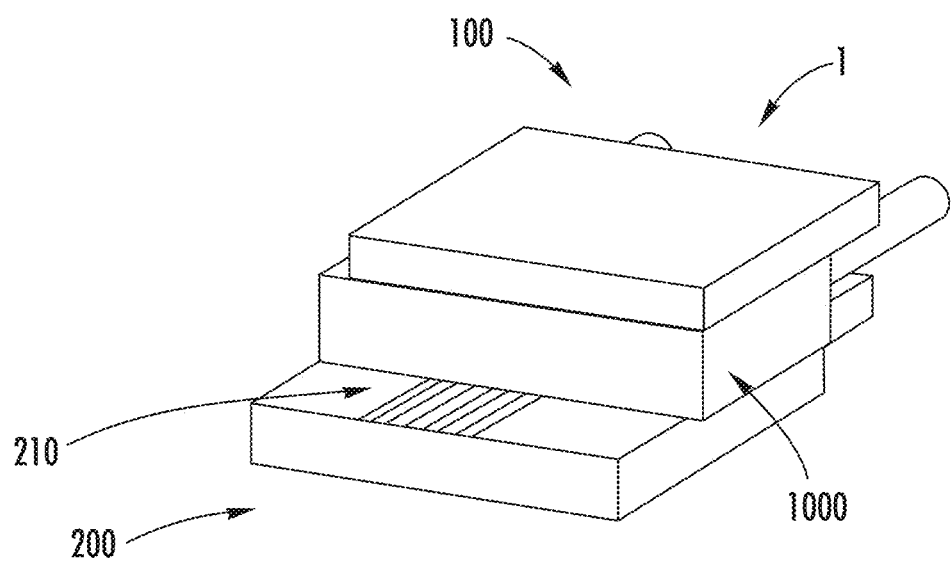

FIGS. 15A and 15B show an embodiment of an optoelectronic assembly 1 comprising a photonic adaptor 100 having a supporting substrate 110 and a covering substrate 120 being arranged above the supporting substrate 110. The supporting substrate 110 comprises the grooves 111 for receiving the alignment pins 150 and the grooves 112 for receiving optical fibers 140. The covering substrate 120 is increased in size in relation to the supporting substrate 110 so that the covering substrate 120 overhangs the supporting substrate 110. The overhanging portion 121 of the covering substrate 120 provides a large area joining surface that is mechanically robust.

The diameter of the alignment pins 150 biases the position of the covering substrate 120 upward, causing the bottom of the covering substrate 120 to be well above the top surface of the optoelectronic substrate 200, for example a planar lightwave circuit. To bridge this gap, a spacer substrate 1200 is provided on the top surface of the optoelectronic substrate 200. The spacer substrate 1200 may be made of glass. The spacer substrate 1200 is sandwiched between the covering substrate 120 and the top surface of the optoelectronic substrate 200, as shown in FIG. 15A. The spacer substrate 1200 can include cut-out regions 1210 to provide clearance for chips or other components located at the perimeter edge of the optoelectronic substrate 200.

FIG. 15B shows the optoelectronic assembly 1 comprising the photonic adaptor 100 being fixed to the optoelectronic substrate 200 by mounting the projecting portion 121 of the covering substrate 120 onto the top surface of the spacer substrate 1200. The overhanging portion 121 of the covering substrate 120 may be fixed to the spacer substrate 1200 by applying an adhesive between the top surface of the spacer substrate 1200 and the bottom surface of the overhanging portion 121 of the covering substrate 120.

Figure 16:
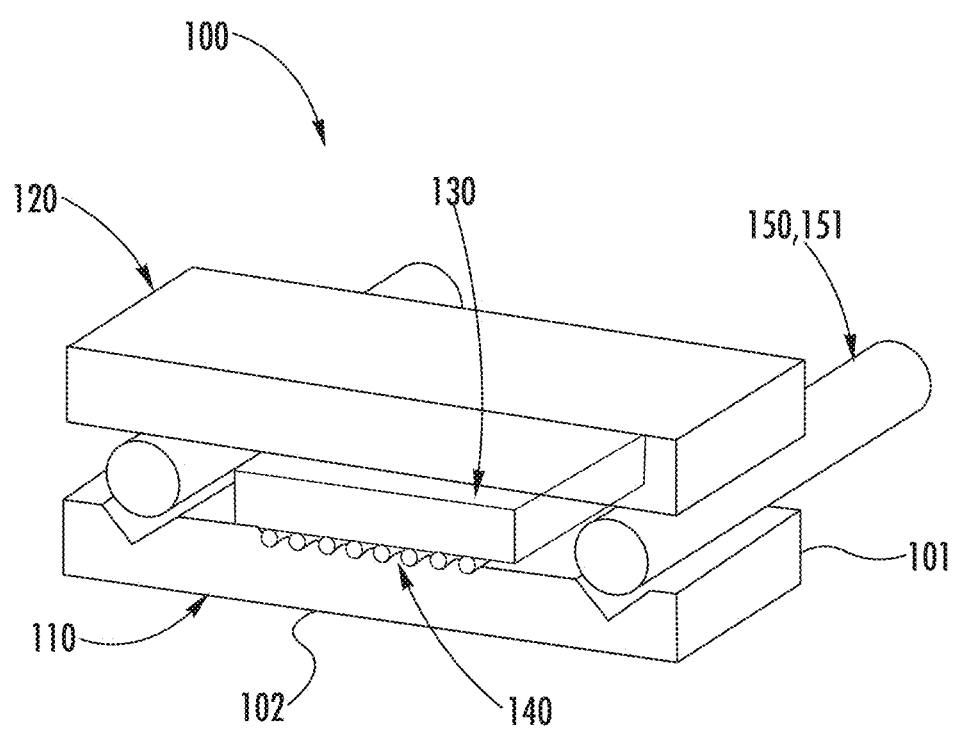
FIG. 16 shows an embodiment of a photonic adaptor for edge bonding of optical fibers to an optoelectronic substrate.

FIG. 16 shows an embodiment of a photonic adaptor 100 comprising a supporting substrate 110 with grooves 111 for receiving alignment pins 150 and grooves 112 for receiving optical fibers 140. The optical fibers 140 are covered by the covering substrate/cover sheet 130. A top layer substrate/covering substrate 120 is arranged above the alignment pins and the covering substrate 130. The embodiment shown in FIG. 16 is similar to the embodiment of the photonic adaptor shown in FIG. 13C, wherein the overhanging region of the supporting substrate 110 has been eliminated, leaving a common flat surface of the supporting substrate 110 and the covering substrates 120, 130 at the face side 102 of the photonic adaptor 100 suitable for edge attachment of the photonic adaptor to an optoelectronic substrate. The optical fibers 140 may be configured as a D-fiber array. The approach of FIG. 16 is also applicable to standard SMF-28-based fiber arrays.

Figure 17A:
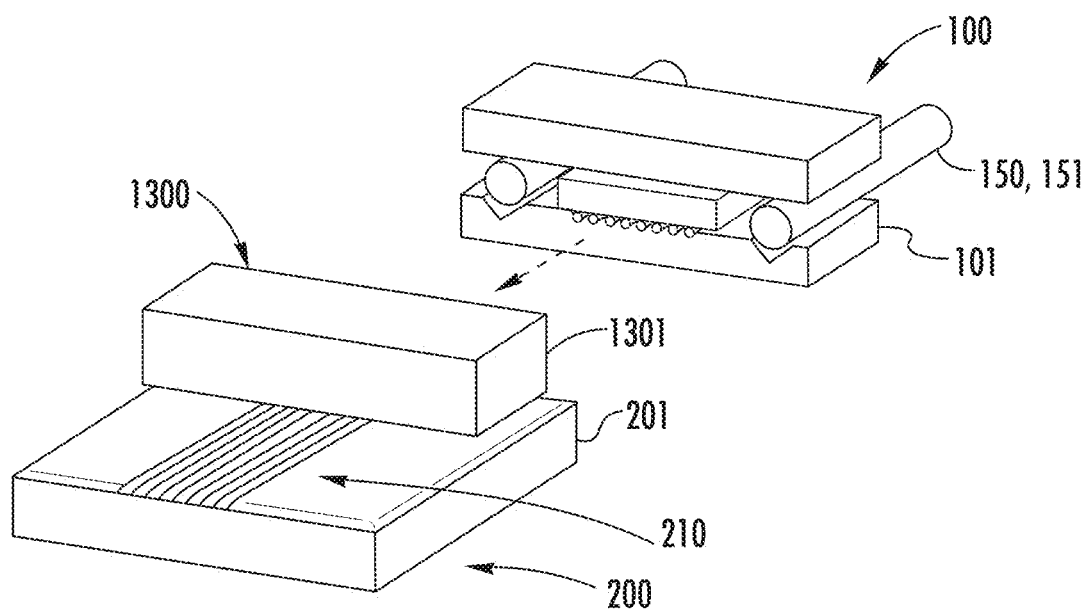
FIGS. 17A and 17B illustrate method steps for manufacturing an optoelectronic assembly using edge attachment for mounting a photonic adaptor to an optoelectronic substrate by a glass rail.
Figure 17B:
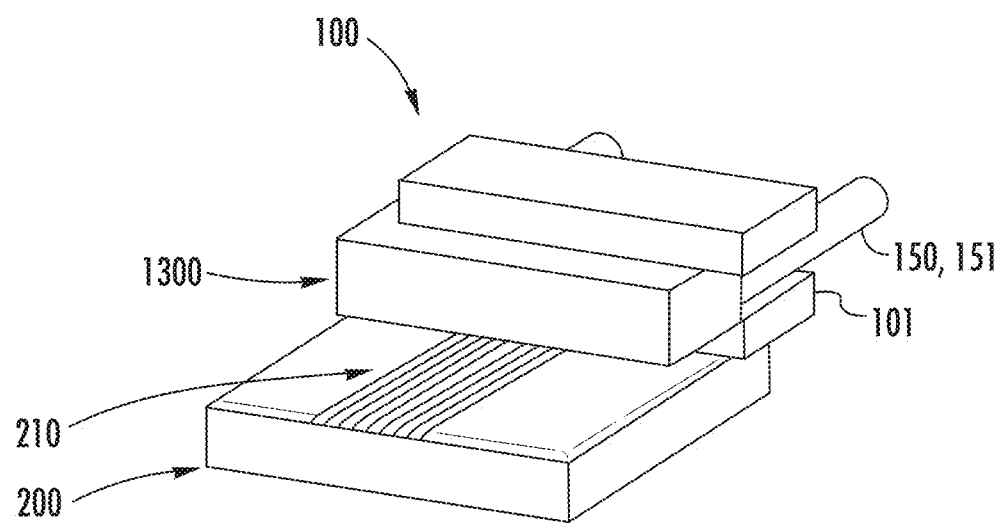

FIGS. 17A and 17B illustrate an edge attachment of the photonic adaptor 100 of FIG. 16 to an optoelectronic substrate 200, for example a planar lightwave circuit, comprising optical waveguides 210 being arranged in a waveguide array on the top surface of the optoelectronic substrate 200. The optical adapter 100 is bonded to an edge of the optoelectronic substrate 200 using a rail 1300, for example made of glass, the rail 1200 being pre-applied to the top surface of the optoelectronic substrate 200. The face side 1301 of the rail 1300 is mounted flush with the face side 201 of the supporting substrate 200. The rail or cap substrate approach at the perimeter of the optical waveguides 210 shown in FIGS. 17A and 17B allows for providing vertical symmetry to the photonic adaptor 100 mounted to the edge of the optoelectronic substrate 200.

Figure 18A:
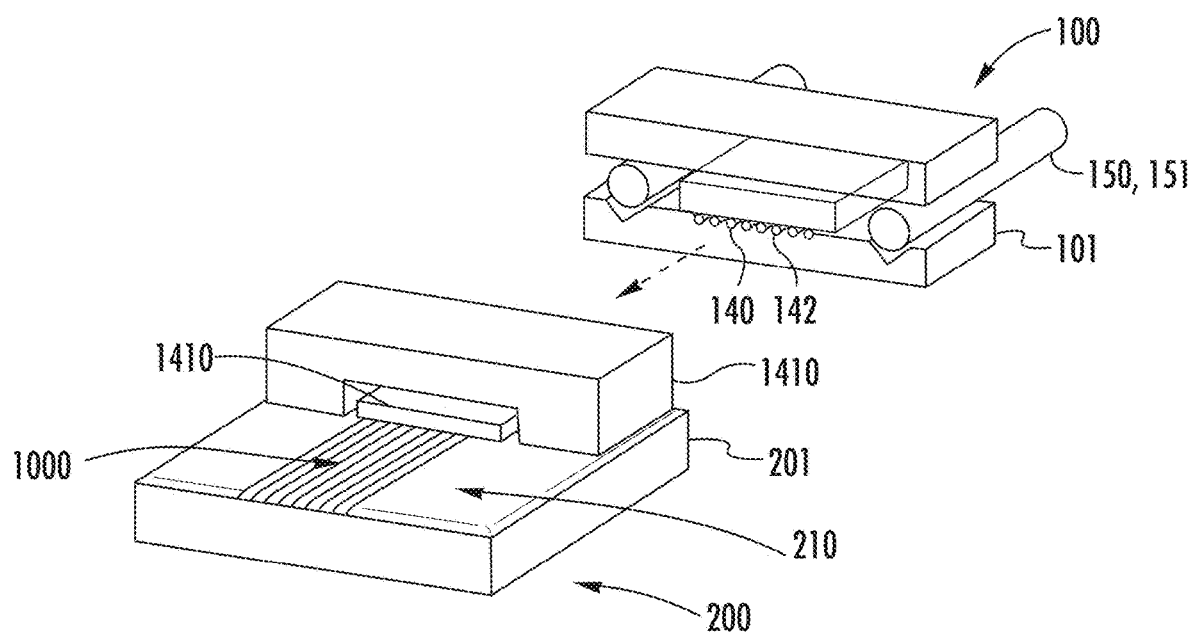
FIGS. 18A and 18B illustrate method steps for manufacturing an optoelectronic assembly using edge attachment for mounting a photonic adaptor to an optoelectronic substrate by using a glass bridge rail.
Figure 18B:
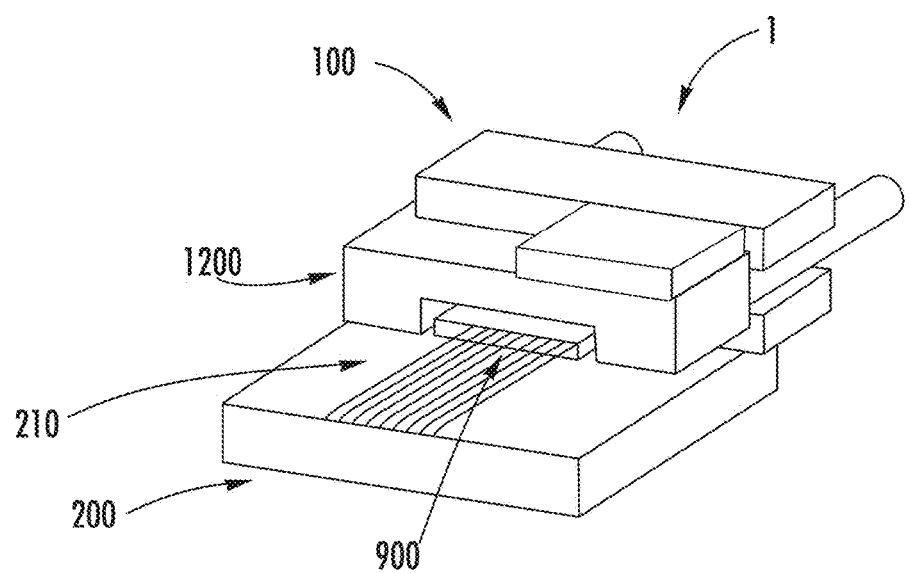

FIGS. 18A and 18B show an edge attachment of the photonic adaptor 100 to the optoelectronic substrate 200 by means of a bridge rail 1400, for example a glass rail. In comparison to the embodiment of the optoelectronic assembly 1 comprising the rail 1300 as illustrated in FIGS. 17A and 17B, the bridge rail 1400 shown in FIGS. 18A and 18B is modified to accommodate a substrate or other component that is located at the perimeter of the optical waveguides 210 of the optoelectronic substrate 200, where the optical waveguides 210 are coupled to the optical fibers 140 of the photonic adaptor 100. Such components could include a mode filed converter/mode field expander 1000 attached to the surface of the optoelectronic substrate or a flexible waveguide substrate that is attached to the photonic adaptor 100. The bridge rail 1400 has a notch 1410 to cover the components mounted over the optical waveguides 210. The bridge rail 1400 could be notched via diamond sawing, coarse grinding, or glass redraw processes. FIGS. 18A and 18B show the bridge rail 1400 being pre-applied to the top surface of the optoelectronic substrate 200 so that a face side 1401 of the bridge rail is mounted flush with the face side 201 the optoelectronic substrate 200.

In the case of using a flexible substrate attached to the photonic adaptor 100 in front of the front sides 142 of the optical fibers 140, the flexible substrate may be threaded through the notch 1410 of the bridge rail 1400 during attachment of the photonic adaptor 100 to the edge of the optoelectronic substrate 200. In principle the notch 1410 could also be used as a passive alignment guide for positioning the flexible waveguide substrate relative to the optical waveguides 210 on the surface of the optoelectronic substrate 200.

Figure 19A:
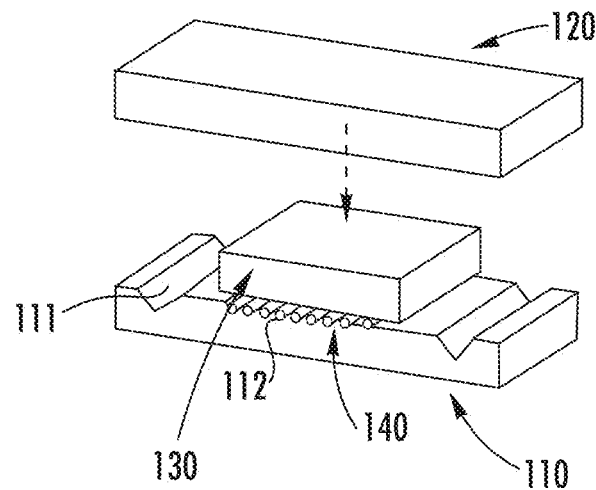
FIGS. 19A to 19C illustrate method steps for manufacturing a photonic adaptor for accepting alignment pins.
Figure 19B:
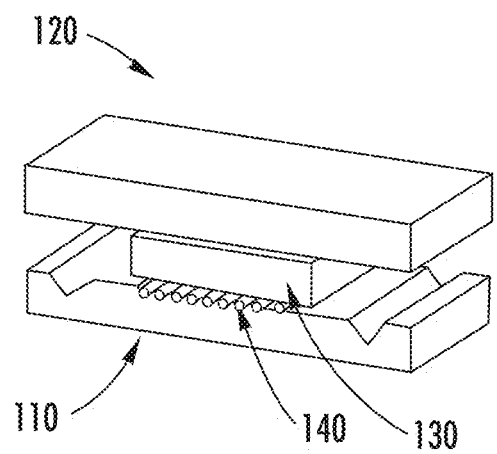
Figure 19C:
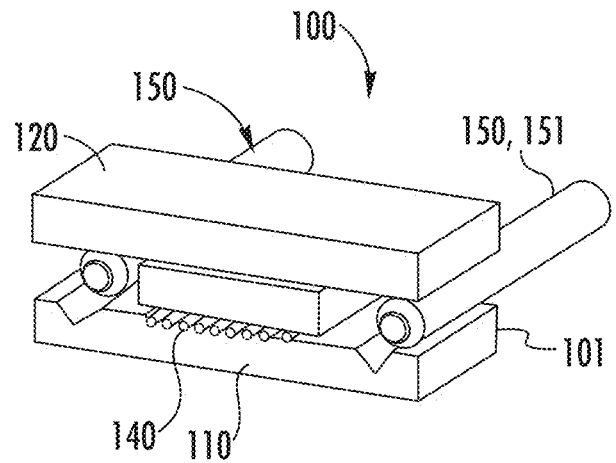

FIGS. 19A to 19C show method steps for assembling a photonic adaptor 100 that accepts alignment pins 150. The photonic adaptor 100 comprises the supporting substrate 110 with the grooves 112 to receive the optical fibers 140 of a fiber array and grooves 111 for accepting the alignment pins 150. As illustrated in FIGS. 19A and 19B, a covering substrate 130 being configured as a precision glass spacer is inserted between the top layer substrate/covering substrate 120 and the bottom layer/supporting substrate 110.

The configuration of the photonic adaptor 100 shown in FIG. 19B allows alignment pins 150 to be accepted in addition to providing the alignment pins. The covering substrate/glass spacer 130 simultaneously serves to hold the optical fibers 140 of the fiber array down and to create a guide pin-size cavity between the top and bottom layer substrates 110 and 120. It appears that precise thickness of glass (controlled to within <0.2 μm) can be obtained by selective harvesting of commercially available glass sheets. FIG. 19C shows the photonic adaptor 100 with the alignment pins 150 partially inserted during use. Hermaphroditic pin-based connectors can also be fabricated using this approach.

To enable a simplified illustration the previous figures, except FIGS. 7A and 7B, show a physical contact coupling between the optical fibers 140 of the photonic adaptor 100 and the optical waveguides 210 of the optoelectronic substrate 200. However, in practical use, the photonic adaptor 100 can be customized on the face side 102 to the optoelectronic substrate depending on the coupling technology. FIGS. 20A to 20E illustrate various coupling techniques that can be used to optically couple the optical fibers 140 of the photonic adaptor 100 to the optical waveguides 210 of the optoelectronic substrate 200.

FIGS. 20A to 20E show the photonic adaptor 100 comprising a ferrule 10 provided by the covering substrates 110 and 130 with optical fibers 140 arranged in the ferrule 10. A top layer substrate/covering substrate 120 is shown having an overhanging portion 121 to attach the photonic adaptor 100 to the optoelectronic substrate 200 including the optical waveguides 210. However, the different coupling techniques illustrated in FIGS. 20A to 20E are not limited to the overlap sheet bonding technique shown in FIGS. 20A to 20E.

FIG. 20A illustrates a physical contact coupling scheme, where the optical fibers 140 of the photonic adaptor 100 and the optical waveguides 210 of the optoelectronic substrate 200 are optically coupled by a direct contact between the front faces 211 of the optical waveguides 210 and the front sides 142 of the optical fibers 140 of the photonic adaptor 100. According to the physical contact interface scheme shown in FIG. 20A, the polished front sides 142 of the optical fibers 140 in the grooves 112 are in direct contact with the front faces 211 of the optical waveguides 210. It is also possible to add an index-matching material in between this physical interface to reduce optical back reflection.

FIG. 20B illustrates a lensed coupling scheme, where the optical fibers 140 of the photonic adaptor 100 and the optical waveguides 210 of the optoelectronic substrate 200 are optically coupled by optical lenses 600. A respective one of the optical lenses 600 is arranged at the face side 102 of the photonic adaptor 100 in front of the respective front side 142 of the optical fibers 140 of the photonic adaptor 100. A lens array 600 is preferably attached to the photonic adaptor 100, if the optical waveguides 210 of the optoelectronic substrate 200 and the optical fibers 140 have different mode field diameters.

FIG. 20C illustrates a flexible waveguide coupling scheme, where the optical fibers 140 of the photonic adaptor 100 and the optical waveguides 210 of the optoelectronic substrate 200 are optically coupled by a respective flexible waveguide 700 being arranged between the respective front side 142 of the optical fibers 140 and the optical waveguides 210 for an evanescent coupling of light. The flexible waveguide 700 be embodied as a glass or polymere waveguide.

FIG. 20D illustrates an optical mirror coupling scheme, where the optical fibers 140 of the photonic adaptor 100 and the optical waveguides 210 of the optoelectronic substrate 200 are optically coupled by a respective optical mirror 800 being arranged between the respective front side 142 of the optical fibers 140 of the photonic adaptor 100 and the optical waveguides 210 of the optoelectronic substrate 200. According to the embodiment illustrated in FIG. 20D, an 80 to 90 degree optical turn is used to couple into vertical waveguide gratings of the optoelectronic substrate 200.

FIG. 20E illustrates an optical fiber turn coupling scheme, where the optical fibers 140 of the photonic adaptor 100 and the optical waveguides 210 of the optoelectronic substrate 200 are optically coupled by a respective flexible coupling fiber 900 being arranged between the respective front side 142 of the optical fibers 140 of the photonic adaptor 100 and a respective one of the optical waveguides 210. The respective flexible coupling fiber 900 is bent so that an end section 901 of the flexible coupling fiber 900 is directed perpendicularly to the respective optical waveguide 210 of the optoelectronic substrate 200. As illustrated in FIG. 20E, an extended piece of an optical fiber bent in a tight radius may be used to form an optical turn directly with the photonic adaptor 100.

What is claimed is:

1. An optoelectronic assembly for mounting to a carrier substrate, comprising:
   an optoelectronic substrate including optical waveguides, wherein a respective front face of the optical waveguides terminates at a face side of the optoelectronic substrate;
   a photonic adaptor comprising:
      a first face side for coupling the photonic adaptor to an optical connector;
      a second face side for coupling the photonic adaptor to an optoelectronic substrate;
      a plurality of optical fibers being arranged between the first face side and the second face side of the photonic adaptor so that a respective first front side of the optical fibers terminates at the first face side of the photonic adaptor and a respective second front side of the optical fibers terminates at the second face side of the photonic adaptor, and
      at least one alignment pin projecting out of at least the first face side of the photonic adaptor, wherein the at least one alignment pin is configured to be inserted in the optical connector terminating an optical cable to align optical fibers of the optical cable to the optical fibers of the photonic adaptor;
   a coupling and alignment layer including a mating structure being configured to receive the at least one alignment pin of the photonic adaptor to mate the photonic adaptor to the optoelectronic substrate;
   wherein the mating structure and the at least one alignment pin are formed such that, in a mated state of the photonic adaptor and the optoelectronic substrate, the optical fibers of the photonic adaptor and the optical waveguides of the optoelectronic substrate are aligned to each other for transferring light between the optical fibers of the photonic adaptor and the optical waveguides of the optoelectronic substrate, and
   the at least one alignment pin is arranged in the mating structure of the coupling and alignment layer and the at least one alignment pin is secured to the mating structure by soldering or laser welding.

2. The optoelectronic assembly of claim 1, wherein the at least one alignment pin has a first portion projecting out of the first face side of the photonic adaptor, the first portion of the at least one alignment pin being configured to be inserted in the optical connector to couple the optical connector to the photonic adaptor and to align the optical fibers of the optical adaptor and the optical fibers of the optical cable for transferring light between the optical fibers of the photonic adaptor and the optical fibers of the optical cable, and the at least one alignment pin has a second portion projecting out of the second face side of the optical adaptor, the second portion of the at least one alignment pin being configured to be inserted in the mating structure of the coupling and alignment layer being mounted at the optoelectronic substrate to couple the photonic adaptor to the optoelectronic substrate and to align the optical fibers of the photonic adaptor and optical waveguides of the optoelectronic substrate for transferring light between the optical waveguides of the optoelectronic substrate and the optical fibers of the photonic adaptor.

3. The optoelectronic assembly of claim 1, comprising:
   a supporting substrate including at least one first groove to receive the at least one alignment pin; and
   a first covering substrate being arranged relative to the supporting substrate such that the at least one alignment pin is fixed between the supporting substrate and the first covering substrate.

4. The optoelectronic assembly of claim 3, wherein the supporting substrate comprises a plurality of second grooves, and each of the plurality of the second grooves is configured to receive one of the plurality of the optical fibers of the photonic adaptor.

5. The optoelectronic assembly of claim 4, wherein the at least one alignment pin is attached to the at least one first groove, and the plurality of the optical fibers of the photonic adaptor are attached to the second grooves of the supporting substrate by means of an adhesive.

6. The optoelectronic assembly of claim 3, comprising a second covering substrate being arranged on a surface of the supporting substrate, the surface of the supporting substrate being directed to the first covering substrate, wherein the plurality of optical fibers of the photonic adaptor are covered by the second covering substrate.

7. The optoelectronic assembly of claim 1, wherein a center axis of the at least one alignment pin and a respective center axis of the plurality of the optical fibers of the photonic adaptor are arranged with an offset to each other in a direction perpendicular to the respective center axis of the at least one alignment pin and the plurality of the optical fibers of the photonic adaptor.

8. The optoelectronic assembly of claim 1, wherein the mating structure is formed by at least one cut-out region in the material of the coupling and alignment layer.

9. The optoelectronic assembly of claim 1, wherein the coupling and alignment layer is arranged on top of the optoelectronic substrate.

10. The optoelectronic assembly of claim 9, comprising a heat spreader being mounted on top of the coupling and alignment layer.

11. The optoelectronic assembly of claim 1, wherein an alignment structure is provided in the material of the top surface of the optoelectronic substrate.

12. The optoelectronic assembly of claim 1, comprising:
a heat spreader being directly mounted on a first surface the optoelectronic substrate, wherein the coupling and alignment layer are arranged on a second surface of the optoelectronic substrate.

13. The optoelectronic assembly of claim 1, wherein the coupling and alignment layer comprise a metal or a glass.

14. The optoelectronic assembly of claim 1, wherein the coupling and alignment layer comprise one or more metallized glass through vias.

15. The optoelectronic assembly of claim 1, wherein the optical fibers of the photonic adaptor and the optical waveguides of the optoelectronic substrate are optically coupled by a direct contact between the front faces of the optical waveguides of the optoelectronic substrate and the second front sides of the optical fibers of the photonic adaptor.

16. The optoelectronic assembly of claim 1, wherein the optical fibers of the photonic adaptor and the optical waveguides of the optoelectronic substrate are optically coupled by optical lenses, and wherein a respective one of the optical lenses is arranged at the second face side of the photonic adaptor in front of the respective second front side of the optical fibers of the photonic adaptor.

17. The optoelectronic assembly of claim 1, wherein the optical fibers of the photonic adaptor and the optical waveguides of the optoelectronic substrate are optically coupled by a respective flexible waveguide being arranged between the respective second front side of the optical fibers of the photonic adaptor and the optical waveguides of the optoelectronic substrate for an evanescent coupling of light.

18. The optoelectronic assembly of claim 1, wherein the optical fibers of the photonic adaptor and the optical waveguides of the optoelectronic substrate are optically coupled by a respective optical mirror being arranged between the respective second front side of the optical fibers of the photonic adaptor and the optical waveguides of the optoelectronic substrate.

19. The optoelectronic assembly of claim 1, wherein the optical fibers of the photonic adaptor and the optical waveguides of the optoelectronic substrate are optically coupled by a respective flexible coupling fiber being arranged between the respective second front side of the optical fibers of the photonic adaptor and a respective one of the optical waveguides of the optoelectronic substrate, wherein the respective flexible coupling fiber is bent so that an end section of the flexible coupling fiber is directed perpendicularly to the respective optical waveguide of the optoelectronic substrate.

* * * * *